(12) United States Patent
Kim

(10) Patent No.: US 11,527,247 B2
(45) Date of Patent: Dec. 13, 2022

(54) COMPUTING DEVICE AND METHOD OF OPERATING THE SAME

(71) Applicant: SAMSUNG ELECTRONICS CO., LTD., Suwon-si (KR)

(72) Inventor: Dongwan Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 174 days.

(21) Appl. No.: 17/123,649

(22) Filed: Dec. 16, 2020

(65) Prior Publication Data

US 2021/0193142 A1 Jun. 24, 2021

(30) Foreign Application Priority Data

Dec. 19, 2019 (KR) .......................... 10-2019-0171032

(51) Int. Cl.
*G10L 15/00* (2013.01)
*G10L 15/22* (2006.01)
*G10L 15/02* (2006.01)
*G10L 15/06* (2013.01)
*G10L 15/08* (2006.01)

(52) U.S. Cl.
CPC .............. *G10L 15/22* (2013.01); *G10L 15/02* (2013.01); *G10L 15/063* (2013.01); *G10L 15/08* (2013.01)

(58) Field of Classification Search
CPC combination set(s) only.
See application file for complete search history.

(56) References Cited

U.S. PATENT DOCUMENTS

| 2014/0272821 A1 | 9/2014 | Pitschel et al. |
| 2017/0277993 A1 | 9/2017 | Beaver et al. |
| 2019/0066672 A1 | 2/2019 | Wood et al. |
| 2019/0074013 A1 | 3/2019 | Lawrence |
| 2019/0196779 A1 | 6/2019 | Declerck et al. |
| 2019/0287518 A1 | 9/2019 | Lee |
| 2020/0013391 A1 | 1/2020 | Park et al. |
| 2020/0013407 A1 | 1/2020 | Chae |

FOREIGN PATENT DOCUMENTS

| KR | 10-2010-0014580 A | 2/2010 |
| KR | 10-2015-0114973 A | 10/2015 |
| KR | 10-2019-0065200 A | 6/2019 |
| KR | 10-2019-0075800 A | 7/2019 |
| KR | 10-2019-0080833 A | 7/2019 |
| WO | WO2019/112625 A1 | 6/2019 |

OTHER PUBLICATIONS

Extended European Search Report dated May 18, 2021, in corresponding European Patent Application No. 20214984.5.
International Search Report (PCT/ISA/210) and Written Opinion of the International Searching Authority (PCT/ISA/237) dated Mar. 15, 2021, in corresponding International Patent Application No. PCT/KR2020/018460.

*Primary Examiner* — Vu B Hang
(74) *Attorney, Agent, or Firm* — Staas & Halsey LLP

(57) ABSTRACT

Provided are a computing device and a method of operating the same. The computing device may include a memory storing one or more instructions, and a processor configured to execute the one or more instructions stored in the memory to recognize a trigger word for another voice assistant, and analyze a response of the other voice assistant to a speech given to the other voice assistant. The computing device simulates an operation performed to correspond to the speech, and performs a subsequent operation, based on a result of the simulating and a result of the analyzing of the response of the other voice assistant.

20 Claims, 19 Drawing Sheets

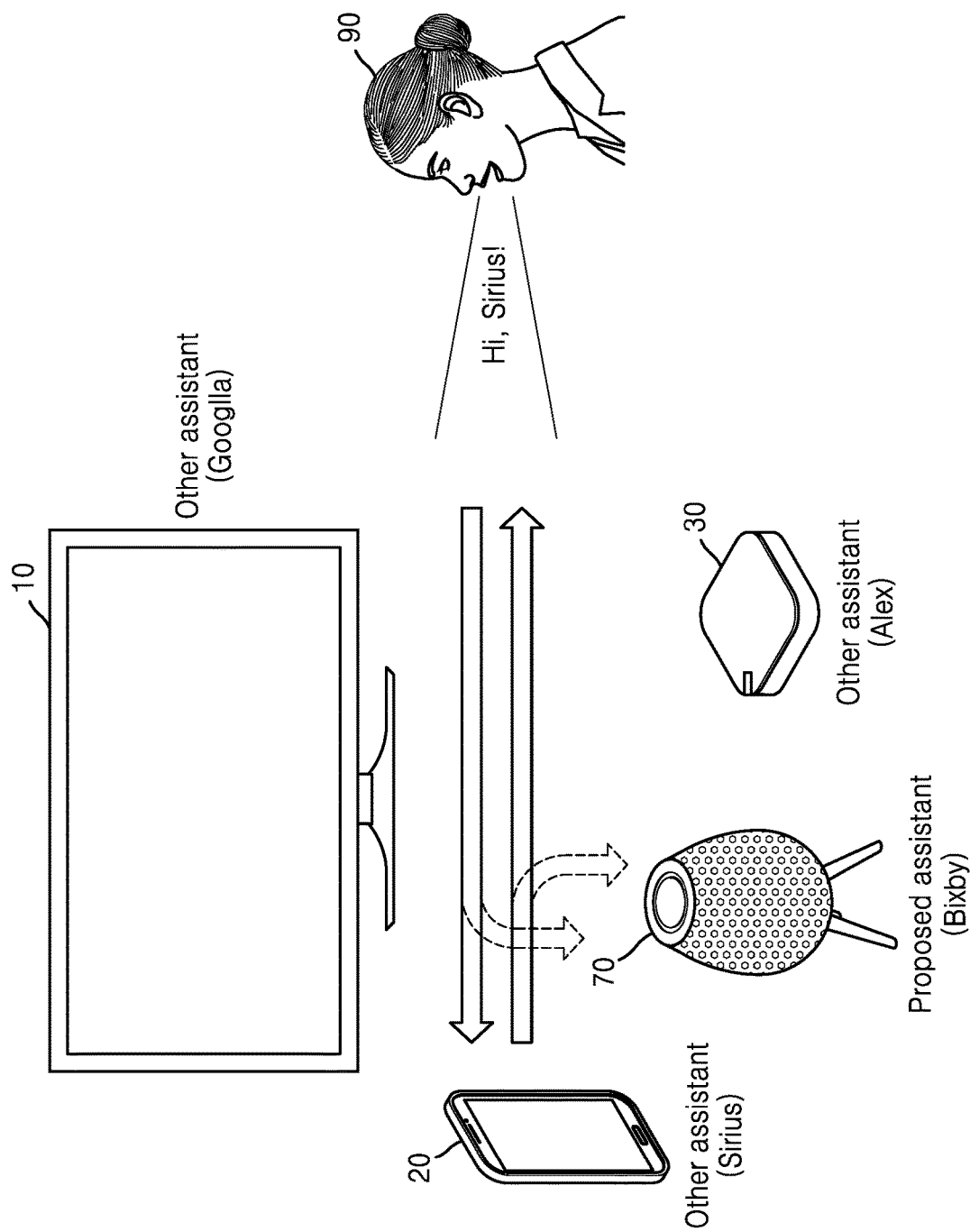

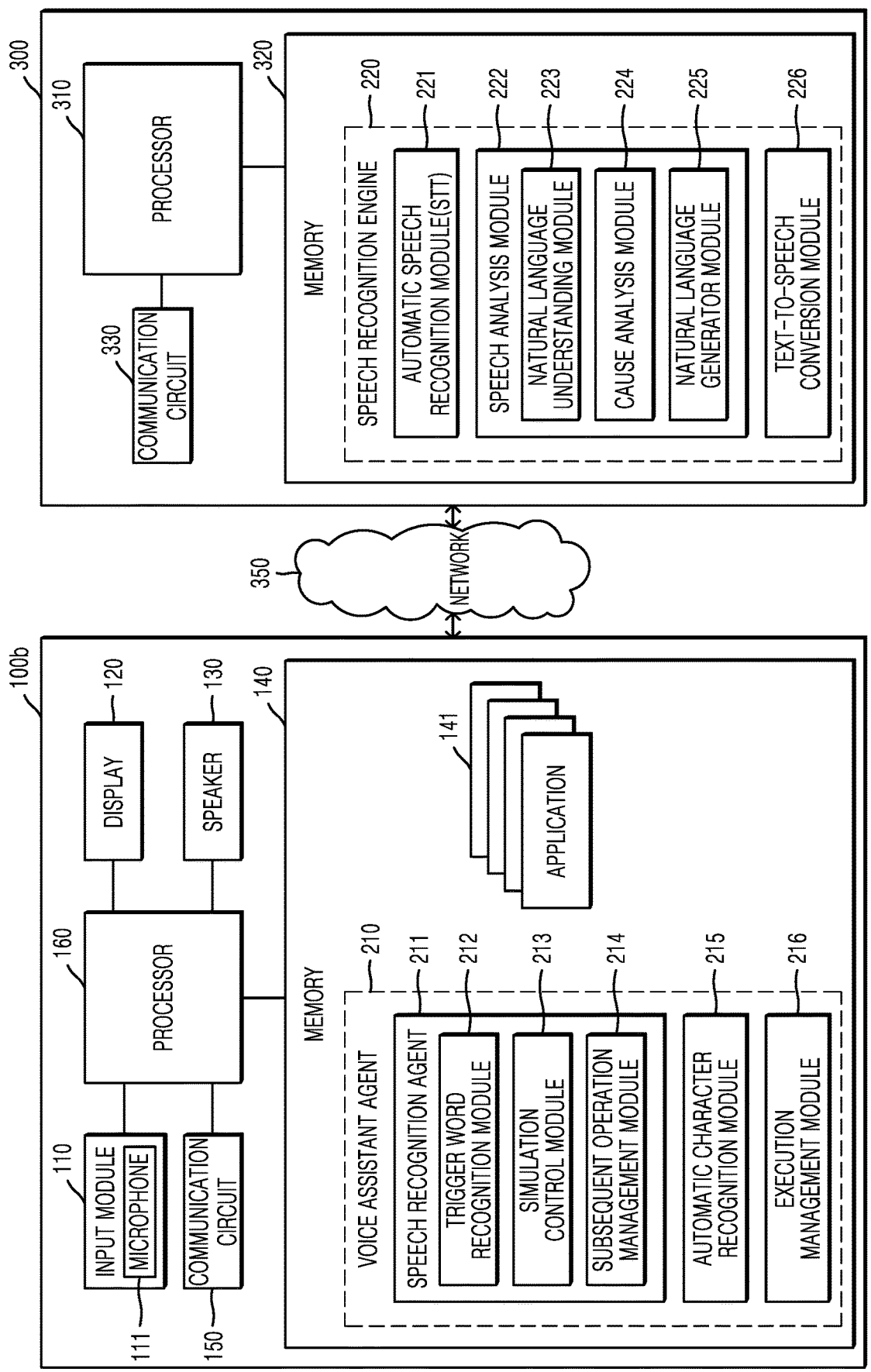

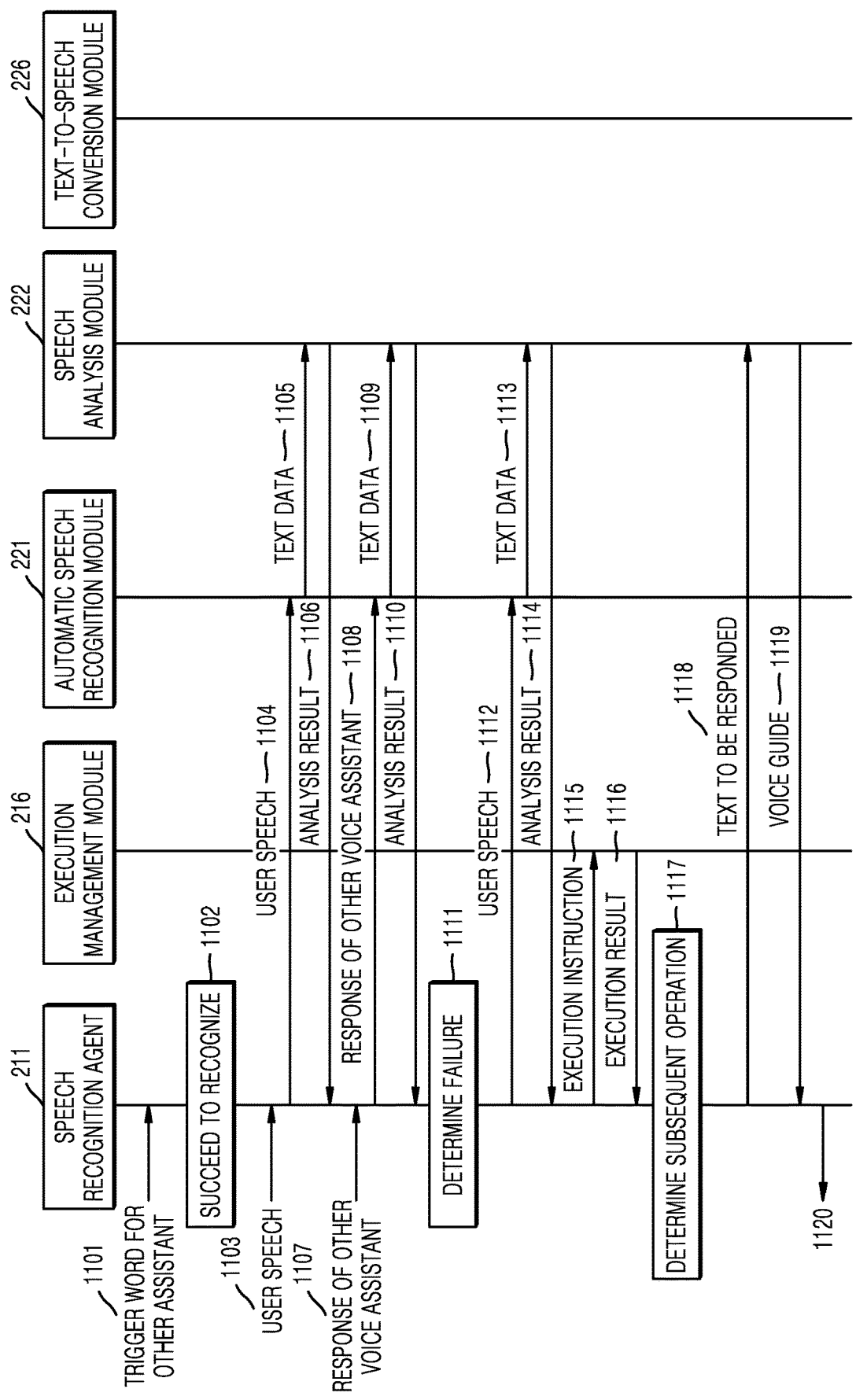

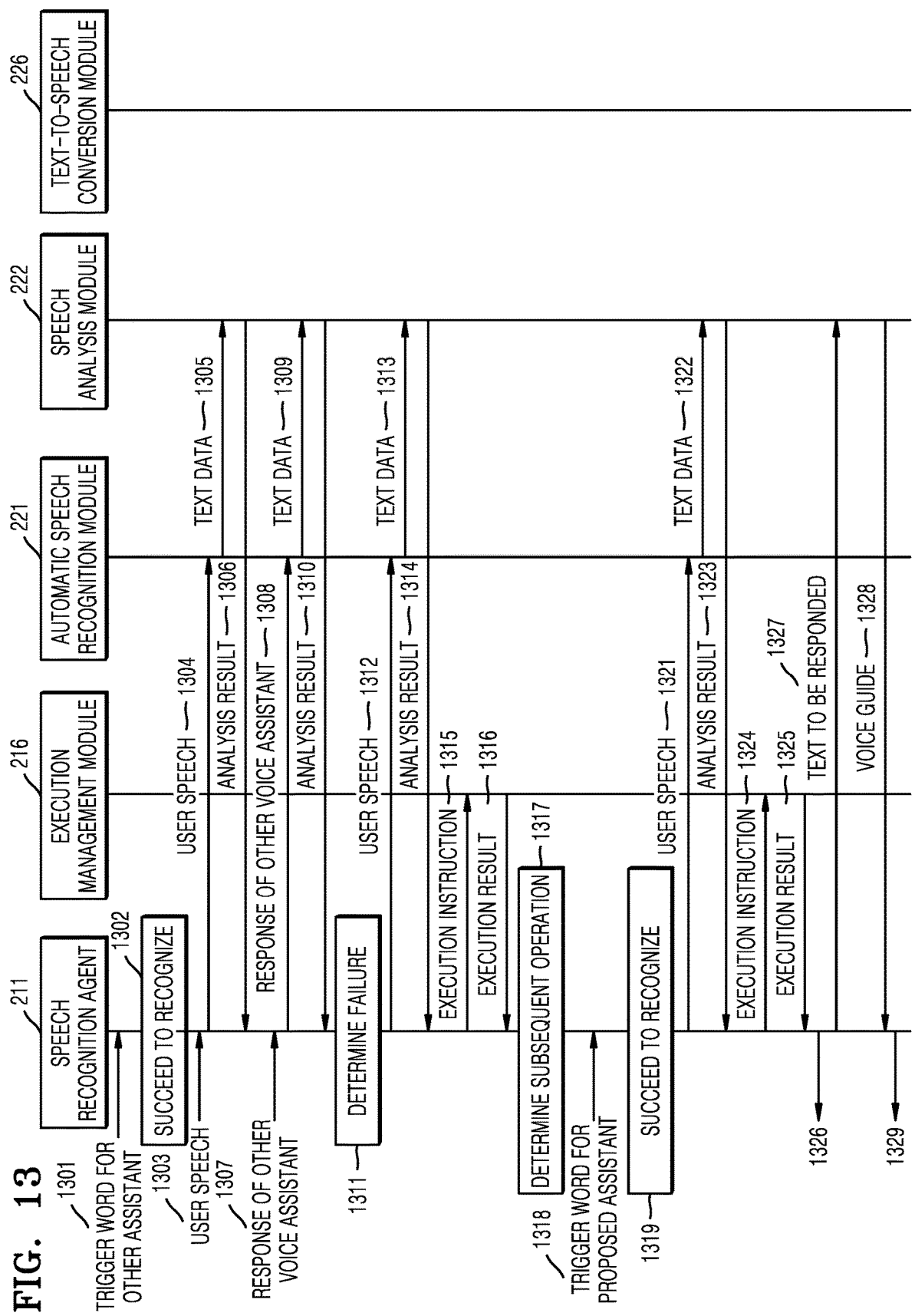

COMPUTING DEVICE AND METHOD OF OPERATING THE SAME

CROSS-REFERENCE TO RELATED APPLICATION

This application is based on and claims priority under 35 U.S.C. § 119 to Korean Patent Application No. 10-2019-0171032, filed on Dec. 19, 2019, in the Korean Intellectual Property Office, the disclosure of which is incorporated by reference herein in its entirety.

BACKGROUND

1. Field

The disclosure relates to a computing device and a method of operating the same, and more particularly, to a computing device capable of enhancing a voice assistant function, and a method of operating the same.

2. Description of Related Art

Currently, a variety of devices capable of supporting a voice assistant function by using artificial intelligence (AI) are widespread. AI systems are computer systems capable of implementing human-level intelligence, and refer to systems in which a machine autonomously learns, makes determinations, and becomes smarter unlike existing rule-based smart systems. Because a recognition rate is increased and user preferences are more accurately understood in proportion to the number of iterations of the AI systems, the existing rule-based smart systems are gradually being replaced by deep-learning-based AI systems.

A device capable of supporting a voice assistant function by using AI may perform a variety of functions, e.g., searching for video/audio content, searching for general knowledge or living information, and executing a specific application. The voice assistant function using AI may be implemented in a variety of computing devices such as a speaker, a television (TV), a smartphone, and an over-the-top (OTT) box.

Due to the spread of various types of devices capable of supporting a voice assistant function by using AI, various voice assistant functions may be implemented in various home appliances. In some cases, two or more voice assistant functions may be implemented in a single device. For example, a TV installed in a house may include a plurality of voice assistant function modules. In general, each voice assistant function module may wake up by a trigger word corresponding thereto. Although various voice assistant function modules are basically similar to each other in providing a service by using voice, each voice assistant function module may provide a unique function or service or provide an enhanced function or service compared to the other voice assistant function modules.

However, a user may not easily know which of the plurality of voice assistant function modules can best serve current requirements of the user.

SUMMARY

Provided are a computing device and method capable of enhancing the performance of a proposed voice assistant module by monitoring operations of one or more other voice assistant modules, i.e., neighboring voice assistant modules.

Additional aspects will be set forth in part in the description which follows and, in part, will be apparent from the description, or may be learned by practice of the presented embodiments of the disclosure.

According to an embodiment of the disclosure, a computing device for providing a voice assistant function includes a memory storing one or more instructions, and a processor configured to execute the one or more instructions stored in the memory to recognize a trigger word spoken to another voice assistant, analyze a response of the other voice assistant in response to a speech given to the other voice assistant, simulate an operation to be performed in response to the speech, and perform a subsequent operation, based on a result of the simulating and a result of the analyzing of the response of the other voice assistant.

The processor may be further configured to execute the one or more instructions to learn the trigger word such that a recognition rate of the trigger word is equal to or greater than a threshold, when the recognition rate of the trigger word is less than a threshold.

The speech to the other voice assistant may include at least one of a speech to request a service, a speech given after a response of the other voice assistant to the request, or an answer of a user to a question of the other voice assistant.

The response of the other voice assistant may include at least one of a voice response, an image response, or a text response.

The processor may be further configured to execute the one or more instructions to determine whether the response of the other voice assistant obtains a result satisfying a request according to the speech, based on at least one of the voice response, the image response, or the text response.

The processor may be further configured to execute the one or more instructions to provide a notification to a user when determining that the result satisfying the request according to the speech is obtained according to the simulation result.

The processor may be further configured to execute the one or more instructions to provide the notification to the user in real time when determining that the response of the other voice assistant does not obtain the result satisfying the request according to the speech.

The processor may be further configured to execute the one or more instructions to provide the notification to the user when a request is received from the user, when determining that the response of the other voice assistant does not obtain the result satisfying the request according to the speech.

The processor may be further configured to execute the one or more instructions to utilize a result of performing the operation in updating a learning system of the computing device when determining that the performed operation fails according to the result of the simulating The processor may be further configured to execute the one or more instructions to update a speech recognition system when determining that the performed operation fails due to recognition failure or an intent analysis error.

According to another embodiment of the disclosure, a method of operating a computing device for providing a voice assistant function includes recognizing a trigger word spoken to another voice assistant, analyzing a response of the other voice assistant in response to a speech given to the other voice assistant, simulating an operation to be performed in response to the speech, and determining and performing a subsequent operation, based on a result of the simulating and a result of the analyzing of the response of the other voice assistant.

According to another embodiment of the disclosure, a computer-readable recording medium has recorded thereon a program for performing a method of operating a computing device for providing a voice assistant function, the method including recognizing a trigger word spoken to another voice assistant, analyzing a response of the other voice assistant in response to a speech given to the other voice assistant, simulating an operation to be performed in response to the speech, and determining and performing a subsequent operation, based on a result of the simulating and a result of the analyzing of the response of the other voice assistant.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a reference view for describing the concept of a system for enhancing voice assistant functions, according to various embodiments of the disclosure;

FIG. 2B is a block diagram of another example of a computing device including a voice assistant, according to an embodiment of the disclosure;

FIG. 11 is a flowchart for describing an operation in a case when another voice assistant fails to provide a service in response to a service request of a user to the other voice assistant and a proposed voice assistant succeeds in a simulation and provides a notification to the user in real time, according to an embodiment of the disclosure;

FIG. 13 is a flowchart for describing an operation in a case when another voice assistant fails to provide a service in response to a service request of a user to the other voice assistant and a proposed voice assistant succeeds in a simulation and provides a notification to the user based on a request of the user, according to an embodiment of the disclosure;

DETAILED DESCRIPTION

Figure 2A:
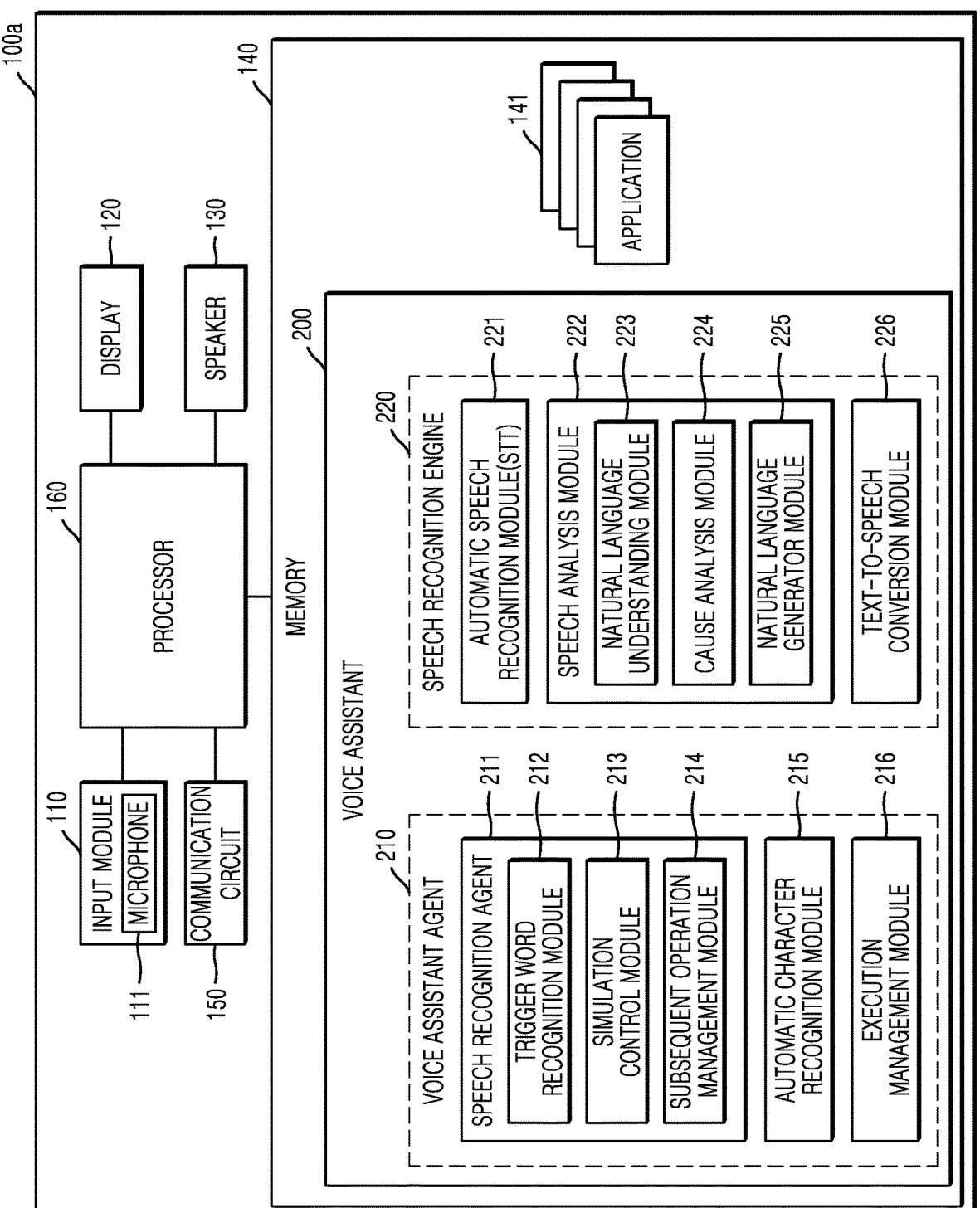
FIG. 2A is a block diagram of an example of a computing device including a voice assistant, according to an embodiment of the disclosure.

Terminology used in this specification will now be briefly described before describing the disclosure in detail.

Although the terms used herein are selected, as much as possible, from general terms that are widely used at present while taking into consideration the functions obtained in accordance with the disclosure, these terms may be replaced by other terms based on intentions of one of ordinary skill in the art, customs, emergence of new technologies, or the like. In a particular case, terms that are arbitrarily selected by the applicant may be used and, in this case, the meanings of these terms may be described in relevant parts of the disclosure. Therefore, it is noted that the terms used herein are construed based on practical meanings thereof and the whole content of this specification, rather than being simply construed based on names of the terms.

It will be understood that the terms "comprises", "comprising", "includes" and/or "including", when used herein, specify the presence of stated elements, but do not preclude the presence or addition of one or more other elements, unless otherwise indicated herein. As used herein, the term "unit" or "module" denotes an entity for performing at least one function or operation, and may be implemented as hardware, software, or a combination of hardware and software.

Throughout the disclosure, the expression "at least one of a, b or c" indicates only a, only b, only c, both a and b, both a and c, both b and c, all of a, b, and c, or variations thereof.

Hereinafter, the disclosure will be described in detail by explaining embodiments of the disclosure with reference to the attached drawings. The disclosure may, however, be embodied in many different forms and should not be construed as being limited to the embodiments of the disclosure set forth herein. In the drawings, parts not related to the disclosure are not illustrated for clarity of explanation, and like reference numerals denote like elements throughout.

As used herein, the term "user" denotes a person who controls the function or operation of a computing device or an electronic device by using a controller, and may include a viewer, a manager, or an installation engineer.

FIG. 1 is a reference view for describing the concept of a system for enhancing voice assistant functions, according to various embodiments of the disclosure.

Referring to FIG. 1, the system may include one or more voice assistants. For example, the system may include a neighboring voice assistant Googlla 10 installed in a television, a neighboring voice assistant Sirius 20 installed in a smartphone, a neighboring voice assistant Alex 30 installed in an over-the-top (OTT) box, and a proposed voice assistant Bixby 70 installed in a speaker.

A voice assistant refers to a technology for providing an assistant service by using artificial intelligence (AI). An AI system is a computer system capable of implementing human-level intelligence, and refers to a system in which a machine autonomously learns and makes determinations, and a recognition rate of which is increased in proportion to the number of system iterations. AI technology includes machine learning (deep learning) technology for autonomously classifying/learning features of input data, and element technologies for mimicking functions, e.g., recognition and determination, of human brains by using the machine learning algorithm. The element technologies may include at least one of, for example, linguistic understanding technology for recognizing human language/text, visual understanding technology for recognizing objects like human vision, inference/prediction technology for determining information and logically performing inference and prediction, knowledge representation technology for processing human experience information into knowledge data, or operation control technology for controlling autonomous driving of vehicles and motion of robots.

The voice assistant may use AI for speech recognition, image recognition, information recommendation, etc. to provide an assistant service. Linguistic understanding for speech recognition is a technology for recognizing and applying/processing human language/text, and includes natural language processing, machine translation, dialog systems, queries and responses, speech recognition/synthesis, etc. Visual understanding for image recognition is a technology for recognizing and processing objects like human vision, and includes object recognition, object tracking, image search, human recognition, scene understanding, space understanding, image enhancement, etc. Inference/prediction for information recommendation is a technology for determining information and logically performing inference and prediction, and includes knowledge/probability-based inference, optimization prediction, preference-based planning, recommendation, etc.

In general, when a unique trigger or wake-up word is received, each voice assistant recognizes the same and enters a mode for listening a subsequent speech from a user 90 who requests a service. For example, the neighboring voice assistant Googlla 10 may be awakened by a trigger word such as "Hi, Googlla", the neighboring voice assistant Sirius 20 may be awakened by a trigger word such as "Hi, Sirius", the neighboring voice assistant Alex 30 may be awakened by a trigger word such as "Hi, Alex", and the proposed voice assistant Bixby 70 may be awakened by a trigger word such as "Hi, Bixby".

Because each voice assistant is generally trained to recognize a unique trigger word therefor, although a user speaks a trigger word to call another voice assistant, the voice assistant may not normally recognize the stated trigger word.

However, the voice assistant according to embodiments of the disclosure may have learned a trigger word therefor together with unique trigger words for other voice assistants, and thus recognize a trigger word stated by the user 90 to call another voice assistant. Once the trigger word is recognized, the voice assistant according to an embodiment of the disclosure may listen and recognize a subsequent speech, i.e., a conversation between the user 90 and the other voice assistant, including a speech given by the user 90 to request the service and a speech given after a response of the other voice assistant to the service request of the user 90. For example, referring to FIG. 1, when the user 90 states a trigger word such as "Hi, Sirius", the proposed voice assistant Bixby 70 may recognize the trigger word and enter a mode for listening a subsequent speech. Then, the proposed voice assistant Bixby 70 may recognize a subsequent speech including an answer or a response of the other voice assistant Sirius 20. In addition to Sirius, the proposed voice assistant Bixby 70 may also have learned the trigger words for the other voice assistants Googlla 10 and Alex 30 to recognize the trigger words.

The voice assistant according to embodiments of the disclosure may perform a subsequent operation by using the recognized speech or conversation. For example, the voice assistant according to embodiments of the disclosure may train or update functions thereof, based on the recognized speech or conversation. Alternatively, the voice assistant according to embodiments of the disclosure may provide a guide or recommendation service for the service requested by the user 90, to the user 90 based on the recognized speech or conversation.

The voice assistant according to embodiments of the disclosure may recognize a trigger word stated by the user 90 to call another voice assistant, and recognize and analyze a speech given by the user 90 to request a service from the other voice assistant, and a response of the other voice assistant to the speech of the user 90.

In addition, the voice assistant according to embodiments of the disclosure may directly simulate an operation performed to correspond to the speech given by the user 90 to request the service from the other voice assistant.

Furthermore, the voice assistant according to embodiments of the disclosure may determine and perform a subsequent operation, based on the result of analyzing the response of the other voice assistant and the result of directly simulating the operation.

When a recognition rate of a trigger word specified based on the result of recognizing the trigger word stated by the user 90 is less than a threshold, the voice assistant according to an embodiment of the disclosure may learn the specified trigger word, the recognition rate of which is less than the threshold. Because the recognition rate less than the threshold indicates that training for recognizing the trigger word is insufficient, the voice assistant according to an embodiment of the disclosure may be trained to enhance the same.

According to an embodiment of the disclosure, the voice assistant according to embodiments of the disclosure may recognize, as the speech of the user 90 to the other voice assistant, at least one of a speech given to request a service or an answer of the user 90 to a question of the other voice assistant.

The voice assistant according to embodiments of the disclosure may recognize a response of the other voice assistant to the service request of the user 90. In this case, the voice assistant according to embodiments of the disclosure may recognize not only a voice response but also a visual or text response of the other voice assistant.

To analyze the voice response of the other voice assistant, the voice assistant according to embodiments of the disclosure may analyze the voice response by using whether the voice response includes a pre-designated word or whether the voice response corresponds to an additional question-type response.

To analyze the visual or text response of the other voice assistant, the voice assistant according to embodiments of the disclosure may recognize an item or text in the visual or text response by using automatic character recognition (ACR) technology, and analyze the meaning of the recognized item or text.

The voice assistant according to embodiments of the disclosure may determine success or failure of the response of the other voice assistant, based on at least one of the voice response or the visual or text response of the other voice assistant. That is, the success or failure may be determined based on whether a result corresponding to the speech is obtained.

The voice assistant according to embodiments of the disclosure may simulate an operation performed to correspond to the speech given by the user 90 to request the service from the other voice assistant, and provide a notification to the user 90 upon determining that the performed operation succeeds according to the simulation result. For example, when the performed operation succeeds according to the simulation result, the voice assistant according to embodiments of the disclosure provide the notification to the user 90 in real time or when a request is received from the user 90. Whether to provide the notification to the user 90 in real time or later when a request to the proposed voice assistant Bixby 70 is received from the user 90 may be determined based on a type of the service requested by the user 90 to the other voice assistant. When the service is meaningful only when performed at a current time, the notification may be provided in real time. For example, "What's the weather now?" or "Call my friend now" is a request for a service which is meaningless when not performed at a current time. Therefore, a notification on the service related to a current time may be provided to the user 90 in real time. When the service does not need to be performed at a current time, the notification may be provided later. For example, "Tell me the schedule for next week" or "Play the latest popular songs" may be determined as a request for a service irrelevant to a current time and, in this case, the notification may not be provided in real time and, when the user 90 calls the proposed voice assistant Bixby 70 and requests any service later, a response to the service request may be provided and then a notification indicating that the service previously failed by the other voice assistant is currently providable may be additionally provided to the user 90. For example, the proposed voice assistant Bixby 70 may primarily provide the service requested by the user 90 and then provide a notification asking whether the user 90 also wants the previously failed service, e.g., "May I tell you the schedule for next week?".

Upon determining that the performed operation fails according to the simulation result, the voice assistant according to embodiments of the disclosure may use the operation performance result to train and update the system.

Upon determining that the operation performed for the simulation fails due to recognition failure or an intent analysis error, the voice assistant according to embodiments of the disclosure may train and update a speech recognition system.

Upon determining that the operation performed for the simulation fails due to absence of a function or service, the voice assistant according to embodiments of the disclosure may train and update a function/service enhancement system or transmit a function/service enhancement request to an external server.

Using the above-described voice assistant according to embodiments of the disclosure, by analyzing an operation of another voice assistant and analyzing a cause of failure of a function/service by the other voice assistant, needs of a user due to failure experience may be monitored and the failed function/service may be provided or proposed to the user. The above-described voice assistant according to embodiments of the disclosure may be enhanced in intelligence without implementing a complicated system and provide the function or service failed by the other voice assistant, to the user by recognizing a speech of the user to the other voice assistant or a response of the other voice assistant to the user through speech or character recognition without being connected to the other voice assistant.

FIG. 2A is a block diagram of an example of a computing device 100a including a voice assistant 200, according to an embodiment of the disclosure. The computing device 100a illustrated in FIG. 2A is an example of the computing device including the proposed voice assistant Bixby 70 illustrated in FIG. 1. In the example of FIG. 2A, most modules for performing voice assistant functions are provided in the computing device 100a.

Referring to FIG. 2A, the computing device 100a may include an input module 110, a display (or a touchscreen display) 120, a speaker 130, a memory 140, a communication circuit 150, and a processor 160. At least some elements of the computing device 100a (e.g., the input module 110, the display 120, the speaker 130, the memory 140, and the communication circuit 150) may be electrically connected to the processor 160. In various embodiments of the disclosure, the computing device 100a may be called an electronic device or a user device, and elements other than those illustrated in FIG. 2A may be further included in or some elements may be omitted from the computing device 100a.

According to an embodiment of the disclosure, the input module 110 may receive a user input from a user.

According to an embodiment of the disclosure, the input module 110 may include a microphone 111 capable of receiving a speech of the user as a voice signal. For example, the input module 110 may include a speech input system, and receive a speech of the user as a voice signal by using the speech input system. In an embodiment of the disclosure, in order to receive an input based on a speech of the user, the microphone 111 may be controlled to be always on or be turned on when the user manipulates a hardware key provided on a portion of the computing device 100a. The microphone 111 may digitize the received analog voice signal and transmit the digitized voice signal to the processor 160. The digitized voice signal may be used by a speech recognition agent 211 to recognize a trigger word, recognize a speech of the user, and recognize a response of another voice assistant.

According to another embodiment of the disclosure, the computing device 100a may receive a voice signal from an external device rather than from the microphone 111 included therein. For example, the computing device 100a may receive a digitized voice signal from a remote controller or a smartphone. For example, the remote controller or the smartphone may include a microphone, receive an analog voice signal of the user through the microphone, digitize the analog voice signal, and transmit the digitized voice signal through a communication circuit to the computing device 100a. The computing device 100a may receive the digitized voice signal through the communication circuit 150 and transmit the same to the processor 160.

According to an embodiment of the disclosure, in addition to the microphone 111, the input module 110 may receive a user input from a connected external device (e.g., a keyboard or a headset). As another example, the input module 110 may include a touchscreen integrated with the display 120 (e.g., a touchscreen display). As still another example, the input module 110 may include hardware keys (or physical keys or capacitive buttons) located on the computing device 100*a*.

According to an embodiment of the disclosure, the display 120 may display an image, a video, and/or an execution screen of an application. For example, the display 120 may display a graphical user interface (GUI) of an application.

According to an embodiment of the disclosure, the speaker 130 may output a voice signal. For example, the speaker 130 may output a voice signal generated in the computing device 100*a*.

The memory 140 may include at least one of flash memory, a hard disk, a multimedia card micro, a memory card (e.g., a secure digital (SD) or extreme digital (XD) memory card), random access memory (RAM), static random access memory (SRAM), read-only memory (ROM), electrically erasable programmable read-only memory (EEPROM), programmable read-only memory (PROM), magnetic memory, a magnetic disc, or an optical disc.

According to an embodiment of the disclosure, the memory 140 may store a plurality of applications 141. The plurality of applications 141 stored in the memory 140 may be selected, executed, and operated based on a user input. According to an embodiment of the disclosure, the memory 140 may include a database capable of storing information required to recognize the user input. For example, the memory 140 may include a log database capable of storing log information. As another example, the memory 140 may include a personal information database capable of storing user information.

According to an embodiment of the disclosure, the memory 140 may store the plurality of applications 141, and the plurality of applications 141 may be loaded and operated by the processor 160. For example, the plurality of applications 141 stored in the memory 140 may be loaded and operated by an execution management module 216 of the processor 160. The plurality of applications 141 may include an execution service (or a plurality of operations or unit operations) for performing a function. The execution service may be generated by the execution management module 216 and execute a plurality of operations.

According to an embodiment of the disclosure, when an operation of an application 141 is executed, an execution screen based on the execution of the operation may be displayed on the display 120.

The communication circuit 150 according to an embodiment of the disclosure may establish wired or wireless communication with at least one external device (e.g., a voice assistant server 300 (see FIG. 2B) according to a prescribed protocol. The communication circuit 150 may transmit or receive at least one type of information related to operation of a speech recognition service based on the wired or wireless communication.

The communication circuit 150 may include one or more modules for enabling wireless communication between the computing device 100*a* and a wireless communication system or between the computing device 100*a* and a network including another electronic device. For example, the communication circuit 150 may include a broadcast receiver module, a mobile communication module, a wireless internet module, and a short-range wireless communication module. The communication circuit 150 may also be called a transmitter/receiver.

The broadcast receiver module receives broadcast signals and/or broadcast information through broadcast channels from an external broadcast management server. The mobile communication module transmits and receives wireless signals to and from at least one of a base station, an external device, or a server in a mobile communication network. The wireless internet module refers to a module for wireless internet access, and may be provided as an embedded or external module. As wireless internet technology, for example, wireless local area network (WLAN) (e.g., Wi-Fi), wireless broadband (Wibro), worldwide interoperability for microwave access (Wimax), or high-speed downlink packet access (HSDPA) may be used. The short-range wireless communication module refers to a module for short-range wireless communication. As short-range wireless communication technology, for example, Bluetooth, radio-frequency identification (RFID), Infrared Data Association (IrDA), ultra-wideband (UWB), or ZigBee may be used.

According to an embodiment of the disclosure, the processor 160 may control overall operations of the computing device 100*a*. For example, the processor 160 may control the input module 110 to receive a user input. The processor 160 may control the display 120 to display an image. The processor 160 may control the speaker 130 to output a voice signal. The processor 160 may control the memory 140 to read or store required information.

In an embodiment of the disclosure, the processor 160 may drive the voice assistant 200 by executing instructions stored in the memory 140. Various modules mentioned in various embodiments of the disclosure may be implemented as hardware or software. In various embodiments of the disclosure, an operation performed by the voice assistant 200 may be understood as an operation performed by the processor 160.

According to an embodiment of the disclosure, the voice assistant 200 may include a voice assistant agent 210 and a speech recognition engine 220. The voice assistant agent 210 may serve to recognize a trigger word stated by the user and determine a subsequent operation by using a result of analyzing a speech of the user. The speech recognition engine 220 may mainly serve to recognize a speech of the user or another voice assistant and provide the recognition result to the voice assistant agent 210.

The voice assistant agent 210 may include the speech recognition agent 211, an automatic character recognition (ACR) module 215, and an execution management module 216.

According to an embodiment of the disclosure, the speech recognition agent 211 may pre-process a user input, i.e., a speech of the user, before transmitting the speech of the user to the speech recognition engine 220. According to an embodiment of the disclosure, to pre-process the user input, the speech recognition agent 211 may include an adaptive echo canceller (AEC) module, a noise suppression (NS) module, an end-point detection (EPD) module, or an automatic gain control (AGC) module. The AEC module may cancel echo included in the speech of the user. The NS module may suppress background noise included in the user input. The EPD module may detect an end point of user voice included in the user input to find a location of the user voice. The AGC module may control the volume of the user input appropriately to recognize and process the user input. Although the speech recognition agent 211 may include all of the above-described pre-processing modules to increase the performance thereof according to an embodiment of the disclosure, in another embodiment of the disclosure, the speech recognition agent 211 may include only some of the above-described pre-processing modules to operate at low power.

According to an embodiment of the disclosure, the speech recognition agent 211 may include a trigger word recognition module 212, a simulation control module 213, and a subsequent operation management module 214.

According to an embodiment of the disclosure, the speech recognition agent 211 may include the trigger word recognition module 212 for recognizing a trigger word stated by the user to call a voice assistant. The trigger word recognition module 212 may recognize the trigger word stated by the user by using a speech recognition module, and activate the speech recognition agent 211 to receive a user input when the trigger word is received. According to an embodiment of the disclosure, the trigger word recognition module 212 of the speech recognition agent 211 may be implemented by a low-power processor (e.g., a processor included in an audio codec). According to an embodiment of the disclosure, the speech recognition agent 211 may be activated based on a user input received using a hardware key.

According to an embodiment of the disclosure, the speech recognition agent 211 may use the trigger word recognition module 212 to recognize not only a trigger word for the voice assistant 200 but also trigger words for one or more other voice assistants.

According to an embodiment of the disclosure, the trigger word recognition module 212 may store not only the trigger word for the proposed voice assistant 200 but also the trigger words for the one or more other voice assistants, and recognize whether the received speech of the user includes the trigger word for the voice assistant 200 or the trigger word for another voice assistant. For example, the trigger word recognition module 212 may store "Hi, Bixby" corresponding to the trigger word for the proposed voice assistant 200, and "Hi, Googlla", "Hi, Sirius", and "Hi, Alex" corresponding to the trigger words for the one or more other voice assistants.

According to an embodiment of the disclosure, the trigger word for the proposed voice assistant 200 and the trigger words for the one or more other voice assistants, which are to be recognized by the trigger word recognition module 212, may have been previously learned using an acoustic model, phonetic symbols, or the like. For example, the trigger word recognition module 212 may recognize "Hi, Bixby" corresponding to the trigger word for the voice assistant 200, and "Hi, Googlla", "Hi, Sirius", and "Hi, Alex" corresponding to the trigger words for the other voice assistants illustrated in FIG. 1. Like the trigger word for the proposed voice assistant 200, acoustic models, phonetic symbols, or the like of the trigger words for the other voice assistants may also have been learned and thus the trigger words for the other voice assistants may be recognized.

According to an embodiment of the disclosure, using a threshold of a recognition score, the trigger word recognition module 212 may determine that a certain trigger word is recognized, when the recognition score of the trigger word exceeds the threshold, and determine that the trigger word is not recognized, when the recognition score of the trigger word does not exceed the threshold. For example, when a certain trigger word is received, a wake-up recognition module of the speech recognition agent 211 may perform an operation for recognizing the trigger word, and output scores for one or more trigger words known by the wake-up recognition module, according to the result of performing the operation. For example, when a trigger word such as "Hi, Bixby" is input, the wake-up recognition module may recognize that the input trigger word corresponds to Bixby, by obtaining a recognition score exceeding the threshold, for Bixby and obtaining recognition scores not exceeding the threshold, for the other voice assistants. The wake-up recognition module may set the threshold of the recognition score to an appropriate value considering optimal recognition and prevention of misrecognition of the input trigger word. The threshold of the recognition score may be appropriately further learned or updated based on the performance or an operation status of the system.

According to an embodiment of the disclosure, when a trigger word for the proposed voice assistant 200 or another voice assistant is recognized, the trigger word recognition module 212 may enter a listening mode to receive a subsequent speech of the user. The proposed voice assistant 200 may be configured to perform an operation and respond to the user based on a subsequently received speech of the user when the trigger word for the proposed voice assistant 200 is recognized, but not to directly respond to a subsequently received speech of the user when the trigger word for the other voice assistant is recognized.

According to an embodiment of the disclosure, after the trigger word for the other voice assistant is recognized, the trigger word recognition module 212 may receive a speech corresponding to a conversation between the user and the other voice assistant, and transmit the received speech to the speech recognition engine 220 to analyze the speech. For example, the speech received by the trigger word recognition module 212 after recognizing the trigger word for the other voice assistant may include all of a speech given by the user to request a service from the other voice assistant, e.g., "Play music", a response given by the other voice assistant to the user to accurately identify an intent of the user, e.g., "What kind of music do you want?", and a response given by the other voice assistant to provide the service in response to the service request of the user, e.g., "OK, here are the latest popular songs".

According to an embodiment of the disclosure, the trigger word recognition module 212 may recognize a user input by using a speech recognition algorithm. The speech recognition algorithm may include at least one of, for example, a hidden Markov model (HMM) algorithm, an artificial neural network (ANN) algorithm, or a dynamic time warping (DTW) algorithm.

The simulation control module 213 may receive, from the speech recognition engine 220, a task rule instructing to simulate an operation corresponding to the speech corresponding to the service request of the user, and instruct the execution management module 216 to perform the operation based on the task rule received from the speech recognition engine 220. In addition, the simulation control module 213 may receive, from the execution management module 216, a result of performing the operation corresponding to the speech of the user, and provide the result to the speech recognition engine 220. For example, when the speech corresponding to the service request of the user is "Tell me the weather today", the simulation control module 213 may receive a task rule determined based on the service request, e.g., a task rule instructing to execute a weather application, check today's weather by using the executed weather application, and output found today's weather, from the speech recognition engine 220 and transmit the same to the execution management module 216.

The subsequent operation management module 214 may receive, from a cause analysis module 224 of the speech recognition engine 220, information indicating whether the operation performed for the simulation by the proposed voice assistant 200 fails, and a cause of failure, and determine and execute a subsequent operation based on the received information.

When the operation performed for the simulation fails, the subsequent operation management module 214 may update or train a recognition function, expand a function/service domain, or connect an external service, based on the cause of failure.

According to an embodiment of the disclosure, when the cause of failure of the operation performed for the simulation is a recognition error or recognition failure of the speech of the user, or a wrong intent analysis, the subsequent operation management module 214 may transmit a command to train and update an automatic speech recognition (ASR) module 221 or a natural language understanding (NLU) module 223, to the speech recognition engine 220 to train and update each function such as speech recognition, natural language processing, intent analysis, or domain classification per element such as language/acoustic model, threshold, or candidate selection criterion.

According to an embodiment of the disclosure, when the cause of failure of the operation performed for the simulation is absence of a function/service, the subsequent operation management module 214 may record the same as a function or service enhancement item or transmit the function enhancement item to a server for providing the function, to update software of the computing device 100a.

According to an embodiment of the disclosure, when the cause of failure of the operation performed for the simulation is absence of a function/service, the subsequent operation management module 214 may search for the function or service by using a function providing server or a service search server, and download and install software for the function or service when the function or service is available.

According to an embodiment of the disclosure, when the cause of failure of the operation performed for the simulation is absence of a function/service and when a search result using a function providing server or a service search server indicates that the function or service is currently unavailable but a time when the function or service is available is identified, the subsequent operation management module 214 may instruct the NLU module 223 of the speech recognition engine 220 to update a dialogue system to provide a notification to the user about when the function or service will be updated or available. For example, when the search result indicates a currently unavailable service will be available next month, the subsequent operation management module 214 may request the NLU module 223 to update the dialogue system to output a response such as "The requested service will be available next month. Thanks for understanding".

When the operation performed for the simulation succeeds, the subsequent operation management module 214 may output, to the user, a notification indicating that the service failed to be provided by the other voice assistant is providable.

When the operation performed for the simulation succeeds and when the notification indicating that the service failed to be provided by the other voice assistant is providable is provided to the user, the subsequent operation management module 214 may determine whether the service needs to be provided in real time, based on a type of the service, and output the notification in real time or when a service request is received from the user, based on the determination result.

According to an embodiment of the disclosure, when the service failed to be provided by the other voice assistant is meaningful only when the notification is provided in real time, for example, when the service related to a current time is requested, the subsequent operation management module 214 may output the notification indicating that the service is providable, in real time. For example, upon determining that the service request of the user, e.g., "Tell me the current time", "Play the World Cup live-streaming channel", or "Find an Italian restaurant near the current location", is closely related to a current place or time and thus is meaningless when the notification is provided later, the notification indicating that the service is providable may be provided to the user in real time. For example, when the service request of the user to the other voice assistant is "Play the World Cup live-streaming channel" and when the other voice assistant fails to respond to the service request, the proposed voice assistant 200 may initially identify an intent of the user by saying "It's Bixby. May I play the World Cup live-streaming channel?", and then provide the service when the user gives a positive answer.

According to an embodiment of the disclosure, when the service failed to be provided by the other voice assistant is not required to be provided in real time, that is, when the service is not closely related to a current time or place, the subsequent operation management module 214 may output the notification indicating that the service is providable, later when a service request to the proposed voice assistant 200 is received. Some users may be startled or feel uncomfortable, for example, when they have requested a service from a voice assistant such as Sirius but another voice assistant, which is not requested, unexpectedly starts a conversation immediately after Sirius fails to provide the service. Therefore, the notification may be provided later unless the service is urgent in time.

For example, a service request such as "Recommend an Italian restaurant in Gangnam" or "Find festivals in Korea this month" is not closely related to a current place or time and thus the service may be effective when provided later. Therefore, in this case, instead of providing the notification in real time when the service is requested to the other voice assistant, the notification indicating that the service is providable may be stored and, when the proposed voice assistant 200 receives another service request from the user later, the subsequent operation management module 214 may initially process the other service request and then output the stored notification indicating that the service failed to be served by the other voice assistant is providable. For example, when a service request such as "What's the weather today?" is received from the user later, the subsequent operation management module 214 may process the service request to provide a response such as "Today is sunny and warm", identify an intent of the user by saying "May I find festivals in Korea this month?", and then provide the service when the user gives a positive answer.

According to an embodiment of the disclosure, the ACR module 215 may capture a screen displayed on the display 120 and recognize and analyze the meaning of characters or text in the captured screen by using ACR technology. For example, when another voice assistant is installed in the computing device 100a and provides a text response to a service request of the user, the ACR module 215 may capture a screen including the text response of the other voice assistant and analyze text included in the screen. For example, when the other voice assistant outputs a screen including a text response such as "Sorry. The requested service cannot be processed", the ACR module 215 may capture the screen, recognize text such as "Sorry. The requested service cannot be processed", and provide the recognized text to the speech recognition engine 220 to analyze the meaning of the text.

According to an embodiment of the disclosure, the execution management module 216 may execute an application 141 by receiving a task rule from the speech recognition agent 211, and control the application 141 to execute an operation included in the task rule. For example, the execution management module 216 may transmit operation execution command information to the application 141 and receive operation completion information from the application 141.

According to an embodiment of the disclosure, the execution management module 216 may manage an operation execution status of the application 141. For example, the execution management module 216 may receive operation execution status information from the application 141, and transmit the operation execution status information to the simulation control module 213.

The speech recognition engine 220 may include the ASR module 221, a speech analysis module 222, and a text-to-speech (TTS) conversion module 226.

Referring to FIG. 2A, the speech recognition engine 220 may include the ASR module 221, the NLU module 223, the cause analysis module 224, a natural language generator (NLG) module 225, or the TTS conversion module 226. In various embodiments of the disclosure, the above-mentioned elements 221, 223, 224, 225, and 226 of the speech recognition engine 220 may be individually implemented, or at least some elements may be integrated with each other. According to an embodiment of the disclosure, the speech recognition engine 220 may include a controller (or a processor) for controlling overall functions and operations of the elements 221, 223, 224, 225, and 226, a storage device (or a memory) connected to the controller, or a communication interface (or a communication module) supporting access to a communication network.

According to an embodiment of the disclosure, the ASR module 221 may convert a user input received from a user device, into text data. For example, the ASR module 221 may include a speech recognition module. The speech recognition module may include an acoustic model and a language model. For example, the acoustic model may include vocal sound information, and the language model may include unit phoneme information and unit phoneme combination information. The speech recognition module may convert a speech of the user into text data by using the vocal sound information and the unit phoneme information. Information about the acoustic model and the language model may be stored in, for example, an automatic speech recognition database (ASR DB).

According to an embodiment of the disclosure, the ASR module 221 may receive a voice signal corresponding to the speech, i.e., the speech given by the user to request the service from the other voice assistant, the response given by the other voice assistant to the user to accurately identify the intent of the user, and the response given by the other voice assistant to provide the service in response to the service request of the user, from the speech recognition agent 211 and convert the same into text data (i.e., speech-to-text (STT) conversion).

According to an embodiment of the disclosure, for accurate recognition, the ASR module 221 may have previously learned unique speaker voices of other voice assistants. Because each voice assistant has a unique speaker voice, by previously learning the unique speaker voices of the other voice assistants, when a response of another voice assistant is input, a recognition rate thereof may be increased.

The speech analysis module 222 may include the NLU module 223, the cause analysis module 224, and the NLG module 225.

According to an embodiment of the disclosure, the NLU module 223 may receive the text data from the ASR module 221, and identify an intent of the user by performing syntactic analysis or semantic analysis. The syntactic analysis may divide the user input into syntactic units (e.g., words, words, or morphemes) and identify syntactic elements of the divided units. The semantic analysis may be performed using semantic matching, rule matching, formula matching, or the like. As such, the NLU module 223 may obtain a domain, an intent, or a parameter required to express the intent of the user input.

According to an embodiment of the disclosure, the NLU module 223 may determine the intent of the user and the parameter by using matching rules divided based on the domain, the intent, and the parameter required to identify the intent. For example, a single domain (e.g., alarm) may include a plurality of intents (e.g., set alarm and clear alarm), and a single intent may include a plurality of parameters (e.g., time, repetitions, and alarm sound). A plurality of rules may include, for example, one or more essential element parameters. The matching rules may be stored in a natural language understanding database (NLU DB).

According to an embodiment of the disclosure, the NLU module 223 may identify the meanings of the words extracted from the user input, by using linguistic features (e.g., the syntactic elements) of the morphemes or words, and determine the intent of the user by matching the identified meanings of the words to domains and intents. For example, the NLU module 223 may determine the intent of the user by calculating how many words extracted from the user input are included in each domain and intent. According to an embodiment of the disclosure, the NLU module 223 may determine the parameter of the user input by using a word serving as the basis for identifying the intent. According to an embodiment of the disclosure, the NLU module 223 may determine the intent of the user by using a natural language recognition database storing linguistic features for identifying the intent of the user input. According to another embodiment of the disclosure, the NLU module 223 may determine the intent of the user by using a personal language model (PLM). For example, the NLU module 223 may determine the intent of the user by using personalized information (e.g., a contact list or a music playlist). The PLM model may be stored in, for example, the natural language recognition database. According to an embodiment of the disclosure, in addition to the NLU module 223, the ASR module 221 may also refer to the PLM model stored in the natural language recognition database, to recognize a voice of the user.

According to an embodiment of the disclosure, the NLU module 223 may generate a task rule based on the intent and the parameter of the user input. For example, the NLU module 223 may select an application 141 to be executed and determine an operation to be performed by the selected application 141, based on the intent of the user input. The NLU module 223 may generate the task rule by determining a parameter corresponding to the determined operation. According to an embodiment of the disclosure, the task rule generated by the NLU module 223 may include information about an application 141 to be executed, an operation to be executed by the application 141, and a parameter required to execute the operation.

According to an embodiment of the disclosure, the NLU module 223 may generate a single task rule or a plurality of task rules by determining an application 141 to be executed, an operation to be executed by the application 141, and a parameter required to execute the operation, based on the intent and the parameter of the user input. For example, the NLU module 223 may generate the task rule by arranging the application 141 to be executed and the operation to be executed by the application 141, according to the intent of the user input in the form of an ontology or a graph model by using information of a user device.

According to an embodiment of the disclosure, the NLU module 223 may select at least one of the plurality of generated task rules. For example, the NLU module 223 may select an optimal task rule from among the plurality of task rules. As another example, the NLU module 223 may select a plurality of task rules when only a partial operation is specified based on the speech of the user. The NLU module 223 may determine one of the plurality of task rules based on an additional user input.

According to an embodiment of the disclosure, the NLU module 223 may transmit the task rule to the voice assistant agent 210 in response to the user input. For example, the NLU module 223 may transmit a single task rule corresponding to the user input to the voice assistant agent 210. As another example, the NLU module 223 may transmit a plurality of task rules corresponding to the user input to the voice assistant agent 210. The plurality of task rules may be generated by the NLU module 223, for example, when only a partial operation is specified based on the speech of the user.

According to an embodiment of the disclosure, the NLU module 223 may determine whether the intent of the user is clear. For example, the NLU module 223 may determine whether the intent of the user is clear, based on whether information of the parameter is sufficient. When the intent of the user is not clear, the NLU module 223 may feed back a request for necessary information to the user. For example, the NLU module 223 may feed back a request for information about a parameter for identifying the intent of the user.

According to an embodiment of the disclosure, the NLU module 223 may include a content provider module. When the operation may be performed based on the intent and the parameter identified by the NLU module 223, the content provider module may generate a result of performing a task corresponding to the user input, and transmit the generated result to the computing device 100*a* as a response to the user input.

According to an embodiment of the disclosure, the NLU module 223 may determine the intent of the user and the parameter, and generate a response (e.g., a task rule) corresponding to the determined intent of the user and the parameter. As such, the generated response may be transmitted to the voice assistant agent 210.

According to an embodiment of the disclosure, the NLU module 223 may receive the text data corresponding to the speech, i.e., the text corresponding to the speech given by the user to request the service from the other voice assistant, the response given by the other voice assistant to the user to accurately identify the intent of the user, and the response given by the other voice assistant to provide the service in response to the service request of the user, from the ASR module 221 and analyze an intent of the user or an intent of the response of the other voice assistant.

According to an embodiment of the disclosure, the NLU module 223 may receive the speech given by the user to request the service from the other voice assistant, and analyze the intent of the user to determine whether the intent is to control a function, control a device, search for content, request a life service, or reproduce music. When the intent of the user is not clear, the other voice assistant may ask a question or provide a question-type response asking for confirmation, the user may give an answer, and then the NLU module 223 may analyze the intent of the user with further reference to the answer of the user. The NLU module 223 may analyze the answer of the user to determine whether the user no longer wants to perform the function or is dissatisfied with the result of the function performed by the other voice assistant. For example, the NLU module 223 may determine that the user is satisfied with the performance of the function or the response of the other voice assistant, when the answer of the user includes a word such as "Okay" or "Right", or determine that the user is dissatisfied with the performance of the function or the response of the other voice assistant, when the answer of the user includes a word such as "Stop", "I don't want", "No", "Cancel", or "Exit".

According to an embodiment of the disclosure, to accurately identify the intent of the user, the NLU module 223 may receive the text corresponding to the response given by the other voice assistant to the user and the response given by the other voice assistant to provide the service in response to the service request of the user, and analyze the voice response of the other voice assistant.

According to an embodiment of the disclosure, the NLU module 223 may determine whether the other voice assistant responds that the function requested by the user cannot be performed. For example, the response of the other voice assistant saying that the requested function cannot be performed may include "Sorry, I can't help you" or "Sorry, there is no function". The NLU module 223 may determine whether the response of the other voice assistant includes a word meaning impossibility or failure, e.g., "Sorry", "I can't", or "Unfortunately".

According to an embodiment of the disclosure, when an intent analysis system other than the NLU module 223 is present, the intent of a speech may be analyzed using the intent analysis system.

According to an embodiment of the disclosure, the cause analysis module 224 may receive the result of the NLU module 223, e.g., the intent of the user or the intent of the response of the other voice assistant, and determine whether the response of the other voice assistant to the speech of the user succeeds or fails. Upon determining that the response given by the other voice assistant to provide the service in response to the speech of the user fails, the cause analysis module 224 may determine a cause of failure.

According to an embodiment of the disclosure, the cause analysis module 224 may determine whether the other voice assistant succeeds or fails to provide the service, by analyzing the service request of the user, the result provided by the other voice assistant in response to the service request of the user, and a stage at which the user leaves the procedure when the other voice assistant asks a question or asks for confirmation.

For example, when the intent of the service request of the user accords with the intent of the response of the other voice assistant, the service request may be determined as success. For example, when the user gives a positive answer, e.g., "Okay" or "Thank you", to the response of the other voice assistant to the service request of the user, the service request may be determined as success. On the other hand, when the intent of the service request of the user does not accord with the intent of the response of the other voice assistant, the service request may be determined as failure. For example, when the user gives a negative answer, e.g., "No" or "Exit", to the response of the other voice assistant to the service request of the user, the service request may be determined as failure.

According to an embodiment of the disclosure, upon determining that the other voice assistant fails to provide the service, the cause analysis module 224 may analyze a cause of failure or a cause of dissatisfaction of the user.

For example, the cause analysis module 224 may analyze whether the other voice assistant misunderstands, i.e., misrecognizes, the speech of the user. For example, when the intent of the service request of the user does not accord with the intent of the response of the other voice assistant, the cause analysis module 224 may determine the cause of failure to provide the service is a speech recognition error or speech recognition failure.

For example, the cause analysis module 224 may analyze whether the other voice assistant correctly recognizes the speech of the user but fails to provide the service due to absence of a function or service requested by the user. For example, when the response of the other voice assistant includes "Sorry. The requested function is not currently available" or "Sorry, but the requested service will be available from next month", the cause analysis module 224 may determine that the service fails to be provided due to absence of a function or service requested by the user.

For example, the cause analysis module 224 may analyze that the other voice assistant provides the function or service requested by the user but fails to provide the service because an additional process such as additional settings or account input is required. For example, when the service request of the user is a request for specific video or audio content and when the user leaves the conversation without giving any answer or gives a negative answer to a response of the other voice assistant asking for additional settings or account input to provide the content, the cause analysis module 224 may determine that the service fails to be provided because an additional process such as additional settings or account input is required. For example, when a service request such as "Play the latest songs of BTS" is received from the user, the other voice assistant may need to access and log in a content provider server for providing a streaming service for the latest songs of BTS. In this case, when the other voice assistant does not include user account information for logging in the content provider server or when the user does not have a user account on the content provider server, the other voice assistant may ask the user for account information on the content provider server or user information for creating an account. In this procedure, due to inconvenience of additionally inputting account information or user information, the user may quit the service request or leave the conversation without continuing. In this case, the cause analysis module 224 may analyze that the other voice assistant provides the function or service requested by the user but fails to provide the service because an additional process such as additional settings or account input is required.

According to an embodiment of the disclosure, the cause analysis module 224 may determine whether the response of the other voice assistant to the speech of the user succeeds or fails, and provide an analysis result corresponding to failure to the speech recognition agent 211 when the service fails to be provided.

The simulation control module 213 of the speech recognition agent 211 may receive the analysis result corresponding to failure of the other voice assistant from the cause analysis module 224 and transmit a control signal to the speech recognition engine 220 to simulate an operation corresponding to the speech corresponding to the failed service request.

The speech recognition engine 220 having received the simulation control signal may recognize and analyze the speech corresponding to the service request of the user, and simulate the operation performed to correspond to the speech by using the ASR module 221 and the speech analysis module 222. Specifically, the ASR module 221 receives and recognizes the speech corresponding to the service request of the user, converts the speech into text data, and transmits the text data to the speech analysis module 222, the NLU module 223 of the speech analysis module 222 receives the text data corresponding to the speech, identifies the intent of the user, generates a task rule to be operated according to the identified intent of the user, and transmits the task rule to the simulation control module 213, and the simulation control module 213 provides the received task rule to the execution management module 216. The execution management module 216 may execute one or more applications 141 according to the received task rule, and provide the application execution result to the simulation control module 213, and the simulation control module 213 may provide the application execution result to the cause analysis module 224 of the speech recognition engine 220.

The cause analysis module 224 having received the application execution result for the simulation may analyze success or failure of the operation performed for the simulation to correspond to the service request.

According to an embodiment of the disclosure, when the performed operation succeeds according to the simulation result, the cause analysis module 224 may transmit the result indicating that the performed operation succeeds, to the simulation control module 213.

According to an embodiment of the disclosure, when the performed operation fails according to the simulation result, the cause analysis module 224 may analyze a cause of failure of the performed operation. The cause of failure of the operation performed for the simulation may include a recognition error or recognition failure of the speech of the user, absence of a function or service requested by the user, or absence of account information. When the performed operation fails according to the simulation result, the cause analysis module 224 may transmit the result indicating that the performed operation fails, together with information about the cause of failure to the simulation control module 213.

According to an embodiment of the disclosure, the NLG module 225 may convert the received information into text-type information. The text-type information may have a form of a natural language speech. The text-type information may include, for example, information about an additional input, information indicating completion of an operation corresponding to a user input, or information indicating an additional input of the user (e.g., feedback information on a user input). The text-type information may be transmitted to the voice assistant agent 210 so as to be displayed on the display 120, or be transmitted to the TTS conversion module 226 so as to be converted into a speech.

According to an embodiment of the disclosure, the TTS conversion module 226 may convert the text-type information into speech-type information. The TTS conversion module 226 may receive the text-type information from the NLG module 225, convert the text-type information into speech-type information, and transmit the speech-type information to the voice assistant agent 210. The voice assistant agent 210 may output the speech-type information through a speaker.

FIG. 2B is a block diagram of another example of a computing device 100*b* including a voice assistant, according to an embodiment of the disclosure.

Referring to FIG. 2B, the computing device 100*b* may be connected through a network 350 to a voice assistant server 300.

The computing device 100*b* is similar to the computing device 100*a* illustrated in FIG. 2A except that the speech recognition engine 220 stored in the memory 140 of the computing device 100*a* illustrated in FIG. 2A is stored in a memory 320 of the voice assistant server 300 illustrated in FIG. 2B.

The voice assistant server 300 includes a processor 310, the memory 320, and a communication circuit 330.

The processor 310 may control overall functions of the voice assistant server 300, e.g., a function of controlling the memory 320 and the communication circuit 330 of the voice assistant server 300.

The communication circuit 330 may communicate through the network 350 with the computing device 100*b* by the control of the processor 310.

The memory 320 may include the speech recognition engine 220. The speech recognition engine 220 may serve equally as that illustrated in FIG. 2A.

Although the computing device 100*a* illustrated in FIG. 2A performs all voice assistant functions, in the system illustrated in FIG. 2B, the voice assistant functions may be performed by the computing device 100*b* and the voice assistant server 300 together. In the example of FIG. 2B, from among the voice assistant functions, a function of recognizing an input speech and analyzing the recognized speech, determining whether a response of another voice assistant fails or succeeds, based on the analysis result, determining a cause of failure when the response fails, or determining a task rule for simulating an operation performed according to a speech of a user may be performed by the speech recognition engine 220 of the voice assistant server 300.

Therefore, referring to FIG. 2B, the voice assistant agent 210 of the computing device 100*b* may recognize a trigger word stated to call another voice assistant, and transmit a speech given after the trigger word is recognized, to the voice assistant server 300, and the speech recognition engine 220 of the voice assistant server 300 may convert the received speech into text to analyze the speech, and determine whether a response of the other voice assistant fails or succeeds, based on the analysis result. The speech recognition engine 220 may transmit the analysis result to the computing device 100*b*, and the computing device 100*b* may simulate an operation corresponding to the speech or control a subsequent operation by using the result received from the speech recognition engine 220.

Meanwhile, the block diagrams of the computing devices 100*a* and 100*b* illustrated in FIGS. 2A and 2B are block diagrams for embodiments of the disclosure. The elements in the block diagrams may be integrated, added, or omitted depending on implemented specifications of the computing devices 100*a* and 100*b*. For example, when necessary, two or more elements may be integrated into one element, or one element may be subdivided into two or more elements. In addition, functions performed in blocks are merely to describe embodiments of the disclosure, and specific operations or devices thereof do not limit the scope of the disclosure.

The above-described system of FIG. 2A relates to on-device speech recognition by which a user device performs ASR, and may operate with a short latency and be usable even when a network is not connected. On the other hand, according to server-based speech recognition by which a server performs ASR as illustrated in FIG. 2B, performance may be increased because speech recognition is performed based on a large database stored in the server. However, embodiments of the disclosure are not limited to the systems illustrated in FIGS. 2A and 2B. For example, the voice assistant server 300 of FIG. 2B includes only the speech recognition engine 220 from among the elements of the voice assistant 200, but is not limited thereto.

According to an embodiment of the disclosure, to increase the performance of the speech recognition system, some elements of the speech recognition engine 220 illustrated in FIG. 2A may be included in the computing device 100*b* or some elements of the voice assistant agent 210 may also be included in the voice assistant server 300.

Alternatively, according to an embodiment of the disclosure, both of the voice assistant agent 210 and the speech recognition engine 220 included in the voice assistant 200 of FIG. 2A may be included in the voice assistant server 300 such that the computing device 100*b* may be involved only in input/output of a speech and input/output of image data and most of the voice assistant functions may be performed by the voice assistant server 300.

Alternatively, according to an embodiment of the disclosure, to increase the performance of the speech recognition system, some elements of the voice assistant agent 210 and/or some elements of the speech recognition engine 220 illustrated in FIG. 2B may be included in a third server computer.

Figure 3:
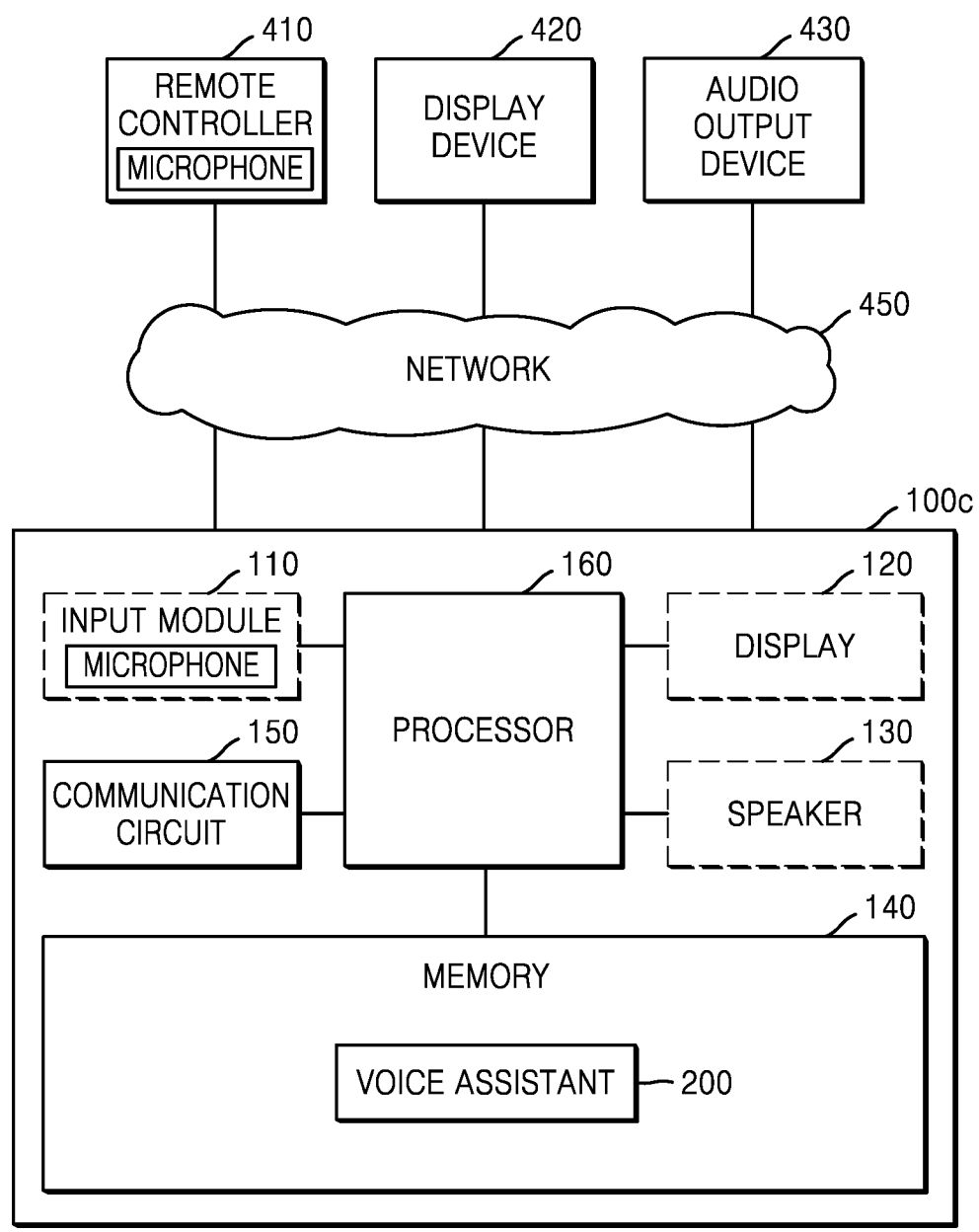
FIG. 3 is a block diagram of another example of a computing device including a voice assistant, according to an embodiment of the disclosure.

FIG. 3 is a block diagram of another example of a computing device 100*c* including the voice assistant 200, according to an embodiment of the disclosure.

Referring to FIG. 3, the computing device 100*c* is broadly similar to the computing device 100*a* illustrated in FIG. 2A except that at least one of the input module 110, the display 120, and the speaker 130 of the computing device 100*c* is replaced by or additionally connected to an external device.

According to an embodiment of the disclosure, in addition to the input module 110 including a microphone, the computing device 100*c* may receive a speech of a user or a response of another voice assistant through a network 450 from a remote controller 410 including a microphone.

According to an embodiment of the disclosure, without including the input module 110 including the microphone, the computing device 100*c* may receive the speech of the user or the response of the other voice assistant through the network 450 from the remote controller 410 including the microphone.

According to an embodiment of the disclosure, the remote controller 410 may include a remote controller including a microphone and performing infrared data association (IrDA) communication or short-range wireless communication (e.g., Wi-Fi or Bluetooth), a smartphone having a remote control application installed therein to control a device such as a television (TV) or perform a speech recognition function, or an AI speaker.

According to an embodiment of the disclosure, in addition to the display 120, the computing device 100*c* may communicate with a display device 420 and thus transmit an image processed by the computing device 100*c*, to the display device 420 to output the processed image. In this case, the display 120 included in the computing device 100*c* may be a simple display window used for a notification or the like.

According to an embodiment of the disclosure, without including the display 120, the computing device 100*c* may transmit the image processed by the computing device 100*c*, through the network 450 to the display device 420 to output the processed image.

The computing device 100*c* may be connected to the display device 420 through the network 450 or through an input/output port capable of simultaneously transmitting video and audio signals, e.g., a high-definition multimedia interface (HDMI) port, a display port (DP), or a thunderbolt port, or input/output ports for separately transmitting video and audio signals.

According to an embodiment of the disclosure, in addition to the speaker 130, the computing device 100*c* may communicate with an audio output device 430 and thus transmit a speech processed by the computing device 100*c*, to the audio output device 430 to output the processed speech.

According to an embodiment of the disclosure, without including the speaker 130, the computing device 100*c* may transmit the speech processed by the computing device 100*c*, through the network 450 to the audio output device 430 to output the processed speech.

The computing device 100*c* may be connected to the audio output device 430 through the network 450 or through an input/output port capable of simultaneously transmitting video and audio signals, e.g., an HDMI port, a DP port, or a thunderbolt port, or input/output ports for separately transmitting video and audio signals.

Figure 4:
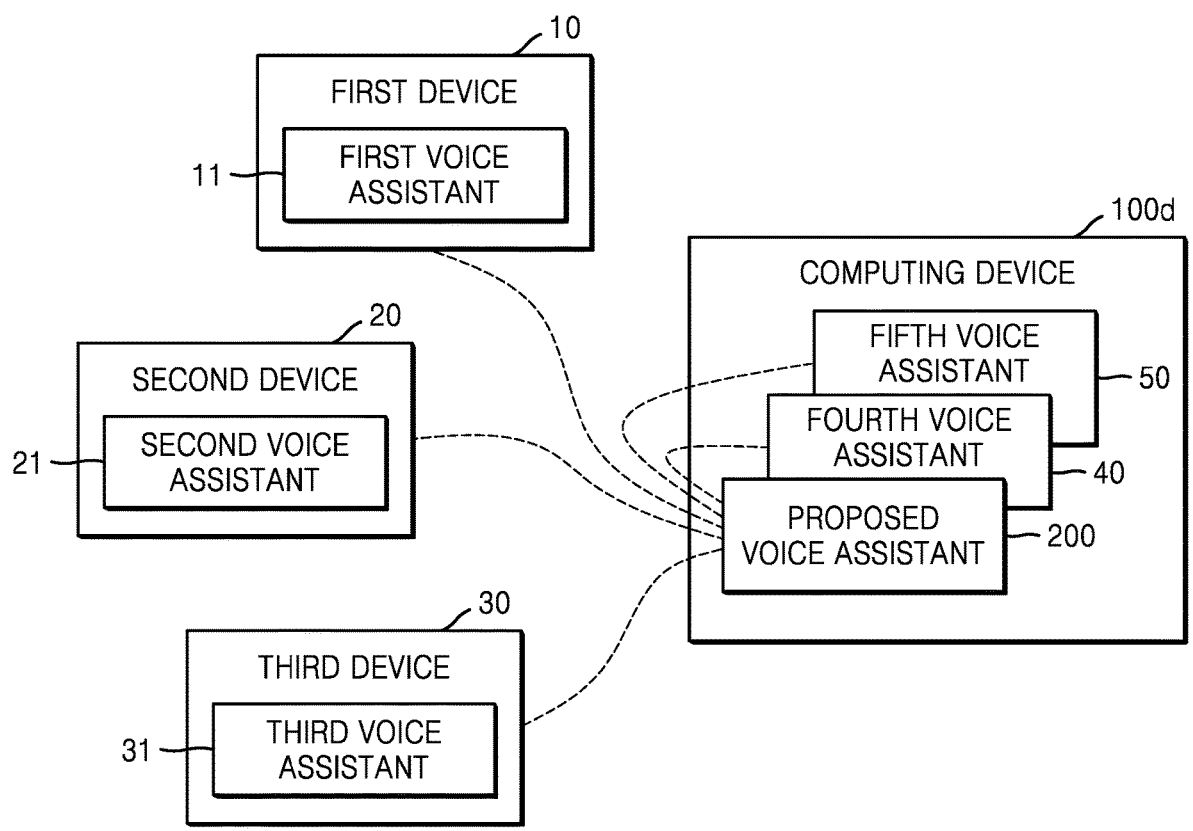
FIG. 4 is a reference view for describing various installation forms of voice assistants, according to an embodiment of the disclosure.

FIG. 4 is a reference view for describing various installation forms of voice assistants, according to an embodiment of the disclosure.

Referring to FIG. 4, the system includes a first device 10, a second device 20, a third device 30, and the computing device 100*d*. A first voice assistant 11 is installed in the first device 10, a second voice assistant 21 is installed in the second device 20, and a third voice assistant 31 is installed in the third device 30. A fourth voice assistant 40, a fifth voice assistant 50, and the voice assistant 200 according to an embodiment of the disclosure are installed in the computing device 100*d* according to an embodiment of the disclosure.

The voice assistant 200 according to the current embodiment of the disclosure may monitor not only responses of the first, second, and third voice assistants 11, 21, and 31 installed in the other devices, i.e., the first, second, and third devices 10, 20, and 30, but also the fourth and fifth voice assistants 40 and 50 installed in the same computing device 100*d*. Like voice assistants installed in other devices, responses of other voice assistants installed in the same computing device 100*d* may also be monitored by receiving speech inputs through a microphone.

Particularly, in addition to voice responses, visual responses of the fourth and fifth voice assistants 40 and 50 installed in the same computing device 100*d*, which are output through a display, may be captured and analyzed.

Figure 5:
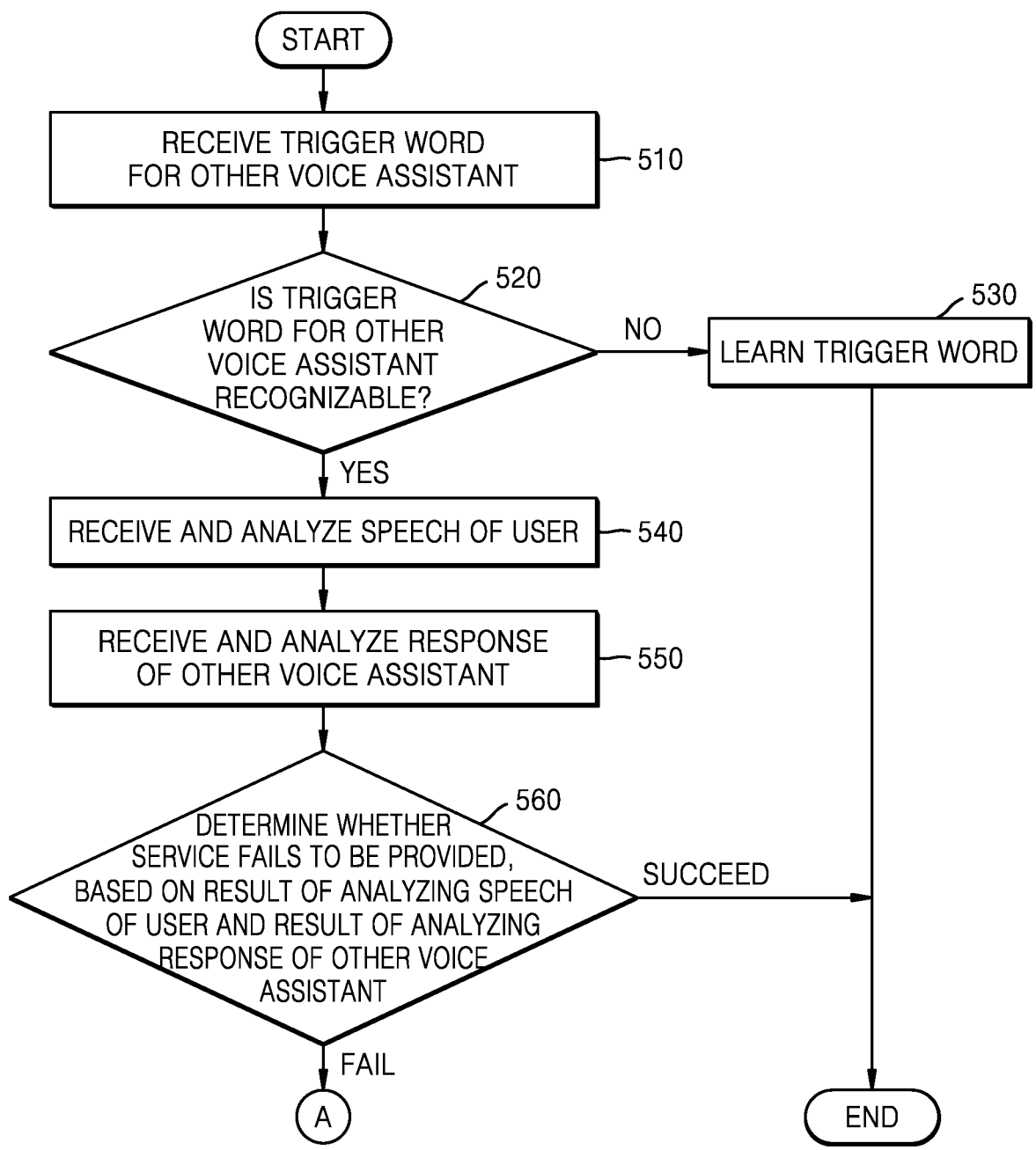
FIGS. 5 and 6 are flowcharts of an example of a method of operating a computing device including a voice assistant, according to embodiments of the disclosure.
Figure 6:
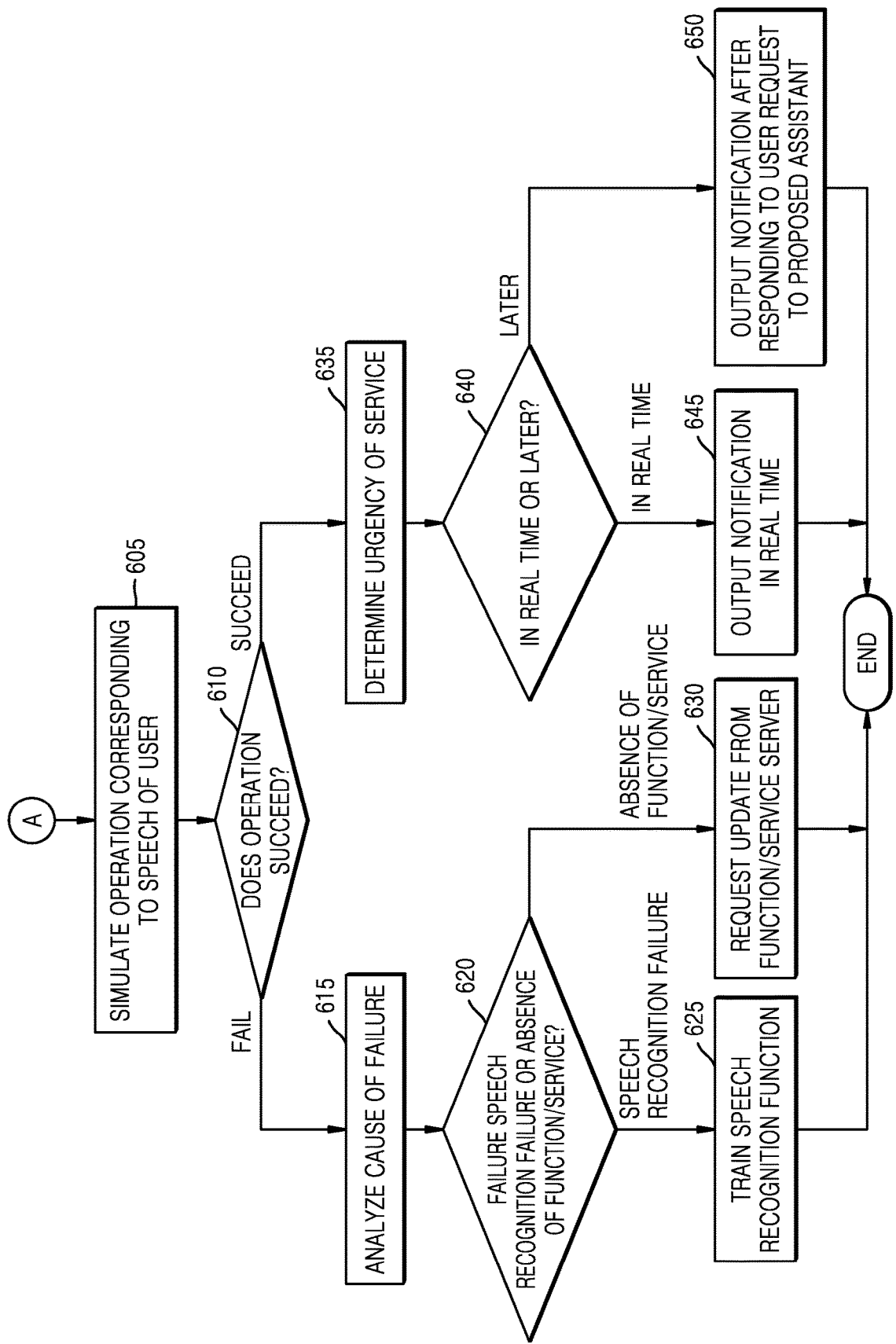

FIGS. 5 and 6 are flowcharts of an example of a method of operating the computing device 100 including a voice assistant, according to embodiments of the disclosure. The computing device 100 may include one of the computing device 100*a*, 100*b*, 100*c*, and 100*d*.

Referring to FIG. 5, in operation 510, the computing device 100 may receive a trigger word for another voice assistant.

In operation 520, the computing device 100 may determine whether the trigger word for the other voice assistant is recognizable.

When the trigger word for the other voice assistant is not recognizable, for example, when a recognition rate thereof is low, the computing device 100 may be trained to increase the recognition rate of the trigger word in operation 530, and terminate the method.

When the trigger word for the other voice assistant is recognizable, in operation 540, the computing device 100 may receive and analyze a speech of a user. Herein, the speech of the user may include a speech given by the user to request a service from the other voice assistant, an answer to a question asked by the other voice assistant to identify an intent of the user, or a subsequent speech given by the user after a response of the other voice assistant. The computing device 100 may identify an intent of the user by analyzing the speech of the user.

According to an embodiment of the disclosure, the computing device 100 may use not only a voice input, i.e., the speech, but also a text input of the user to analyze the intent of the user. For example, when the other voice assistant outputs a screen including a user interface (UI) for asking the intent of the user by using menus or buttons and the user selects a menu or button on the UI in response, the computing device 100 may capture a screen including the selected button, extract text corresponding to the menu or button selected by the user by using ACR technology or the like, and analyze the text to analyze the intent of the user.

In operation 550, the computing device 100 may receive and analyze a response of the other voice assistant. Herein, the response of the other voice assistant may include not only a response to the service request of the user but also a question asked to the user to identify the intent of the user. The computing device 100 may analyze the response of the other voice assistant to determine whether the other voice assistant correctly recognizes the speech, whether the other voice assistant correctly identifies the intent of the user, or whether the other voice assistant provides an appropriate service according to the intent of the user.

According to an embodiment of the disclosure, the response of the other voice assistant may include not only a voice response but also a text response. The voice response refers to a response of the other voice assistant to the service request of the user, which is output in the form of voice. The text response refers to a response of the other voice assistant to the service request of the user, which is output in the form of an image including text. Herein, the image including text may include not only an image including text but also an image including a visual UI including items such as buttons or menus. The voice response of the other voice assistant may be recognized by a speech recognition module, and the text response may be recognized by capturing a display screen and then extracting text by using ACR technology or the like.

In operation 560, the computing device 100 may determine whether the other voice assistant fails to provide the service, based on the result of analyzing the speech of the user and the result of analyzing the response of the other voice assistant.

According to an embodiment of the disclosure, upon determining that the other voice assistant succeeds to provide the service, the computing device 100 may terminate the method.

According to another embodiment of the disclosure, even when the other voice assistant succeeds to provide the service, the computing device 100 may proceed to operation A to simulate an operation performed to correspond to the speech of the user.

Upon determining that the other voice assistant fails to provide the service, the computing device 100 may proceed to operation A.

After proceeding to operation A, in operation 605, the computing device 100 simulates an operation performed to correspond to the speech of the user.

In operation 610, the computing device 100 determines whether the performed operation succeeds according to the simulation result, and proceeds to operation 615 when the operation performed for the simulation fails.

In operation 615, the computing device 100 may analyze a cause of failure of the operation performed for the simulation.

In operation 620, the computing device 100 may determine whether the cause of failure of the operation performed for the simulation is speech recognition or intent analysis failure, or absence of a function or service.

When the cause of failure of the operation performed for the simulation is speech recognition failure, in operation 625, the computing device 100 may train a speech recognition function thereof. Therefore, even when the operation performed for the simulation fails, the computing device 100 may autonomously enhance the speech recognition function by finding a weak part of the speech recognition function and training the speech recognition function.

When the cause of failure of the operation performed for the simulation is absence of a function/service, in operation 630, the computing device 100 may request an update from a function/service server. Therefore, even when the operation performed for the simulation fails, the computing device 100 may find and update the service or function that the computing device 100 lacks, or recognize and manage the service or function that the computing device 100 lacks, by recording the service or function.

In operation 610, the computing device 100 determines whether the performed operation succeeds according to the simulation result, and proceeds to operation 635 when the operation performed for the simulation succeeds.

In operation 635, the computing device 100 may determine urgency of the service failed by the other voice assistant. For example, the computing device 100 may determine whether the service is meaningful only when provided in real time or does not matter even when not provided in real time.

In operation 640, the computing device 100 may determine whether the service needs to be provided in real time.

Upon determining that the service is meaningful only when provided in real time, in operation 645, the computing device 100 may notify that the service is providable to the user in real time.

Upon determining that the service does not matter even when provided later, in operation 650, the computing device 100 may respond to a service request of the user to the proposed voice assistant and then output, to the user, a notification indicating that the service previously failed by the other voice assistant is providable.

The urgency of the service is determined in operation 635 of FIG. 6 to determine a timing for notifying the user when the simulated operation succeeds. However, the timing may not be determined based on the urgency of the service. Whether to provide the notification in real time or later may be determined based on various other criteria. Alternatively, according to another embodiment of the disclosure, whether to provide the notification in real time or later does not need to be determined and may be set by default in the computing device 100.

Although the computing device 100 simulates the operation corresponding to the speech corresponding to the service request of the user when the other voice assistant fails to provide the service in FIGS. 5 and 6, the computing device 100 is not limited thereto and may always simulate the operation corresponding to the service request of the user regardless of whether the other voice assistant fails to provide the service. In this case, the computing device 100 may compare the service result of the other voice assistant to the simulation result thereof, and notify the user that an enhanced service is providable, upon determining that the simulation result thereof is better than the service result of the other voice assistant.

Various scenarios in the computing device 100 according to embodiments of the disclosure will now be described with reference to FIGS. 7 to 17.

Figure 7:
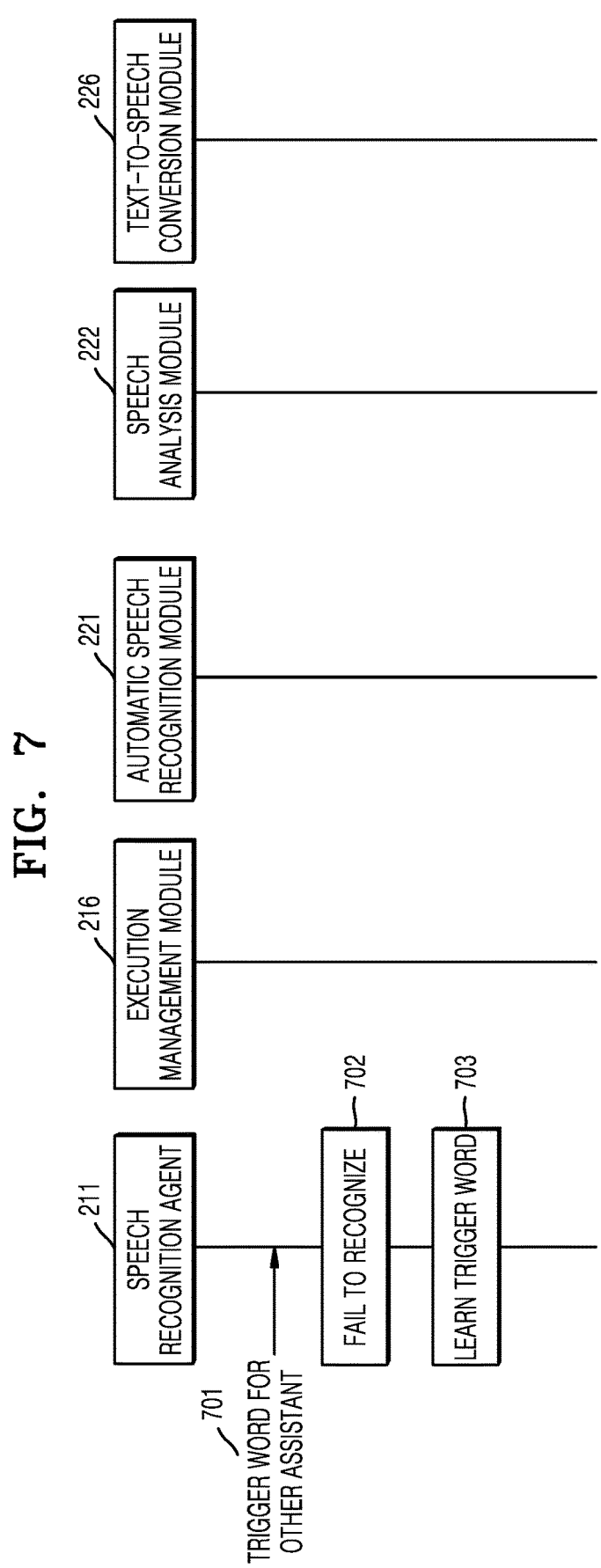
FIG. 7 is a flowchart for describing an operation in a case when a computing device fails to recognize a trigger word for another voice assistant, according to an embodiment of the disclosure.

FIG. 7 is a flowchart for describing an operation in a case when the computing device 100 fails to recognize a trigger word for another voice assistant, according to an embodiment of the disclosure.

Referring to FIG. 7, in operation 701, the speech recognition agent 211 may receive a trigger word for another voice assistant.

In operation 702, the speech recognition agent 211 may perform recognition but fail to recognize the trigger word for the other voice assistant.

The speech recognition agent 211 according to an embodiment of the disclosure may recognize not only a trigger word for a proposed voice assistant but also trigger words for one or more other voice assistants by previously learning the same. Because the speech recognition agent 211 has learned a plurality of trigger words as described above, when speech recognition is performed using a speech recognition module on a trigger word which is input later, a speech recognition score corresponding to each of the trigger words for the voice assistants, which have been learned by the speech recognition agent 211, may be output. When the speech recognition score exceeds a preset threshold, it may be determined that a trigger word for a voice assistant corresponding to the speech recognition score exceeding the threshold is recognized. Therefore, even when no speech recognition score exceeds the preset threshold, a trigger word for a voice assistant failed to be recognized may be determined based on score values.

Figure 8:
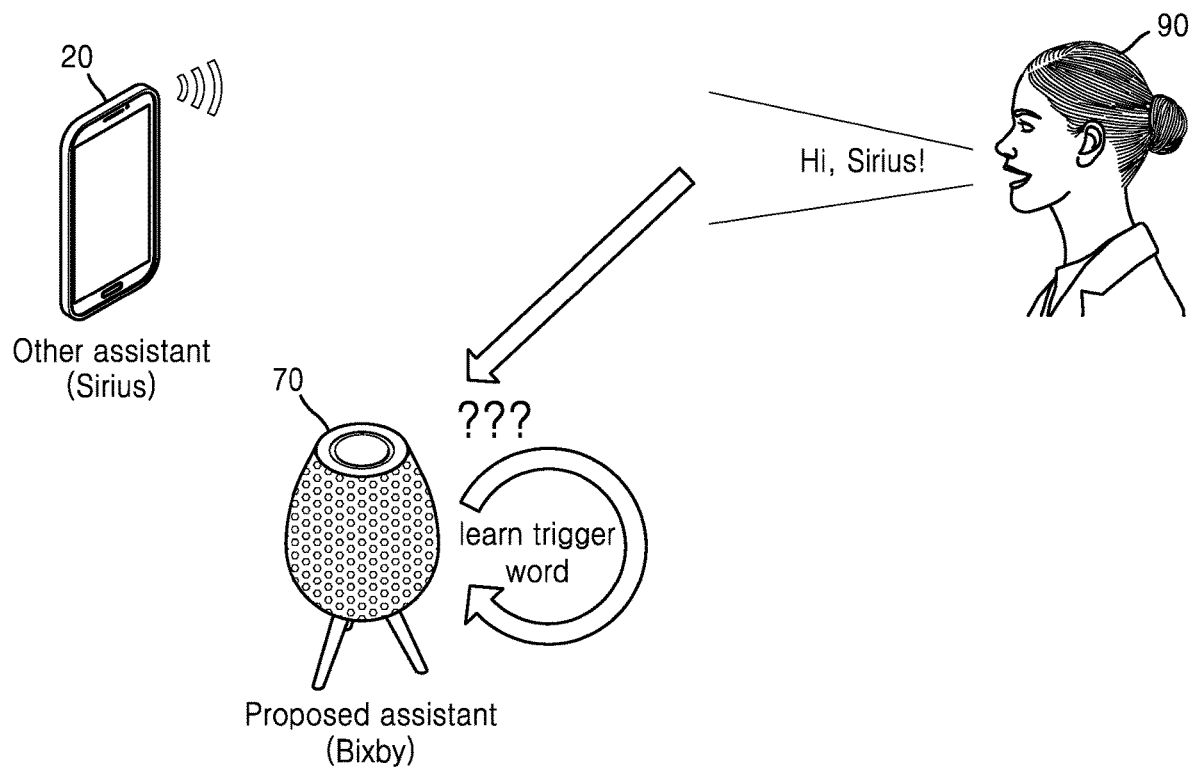
FIG. 8 is a reference view showing a case when recognition of a trigger word for another voice assistant fails.

FIG. 8 is a reference view showing a case when recognition of a trigger word for another voice assistant fails.

For example, when a user 90 states "Hi, Sirius" to another voice assistant 20 as illustrated in FIG. 8, a proposed voice assistant Bixby 70 may receive the trigger word "Hi, Sirius" and perform recognition to find out a voice assistant corresponding to the trigger word. In this case, when the result of performing recognition indicates that a score corresponding to a trigger word for a voice assistant "Sirius" is the highest, e.g., 50%, from among those corresponding to a plurality of trigger words recognized by Bixby, but is lower than a threshold for determining recognition success, e.g., 80%, the proposed voice assistant Bixby 70 may determine that recognition of the trigger word fails.

Therefore, in operation 703, the speech recognition agent 211 may be trained to enhance a function of recognizing the trigger word failed to be recognized.

Even when recognition of the trigger word for the other voice assistant fails as described above, the speech recognition agent 211 may be trained to recognize the failed trigger word and thus enhance the trigger word recognition function thereof.

Figure 9:
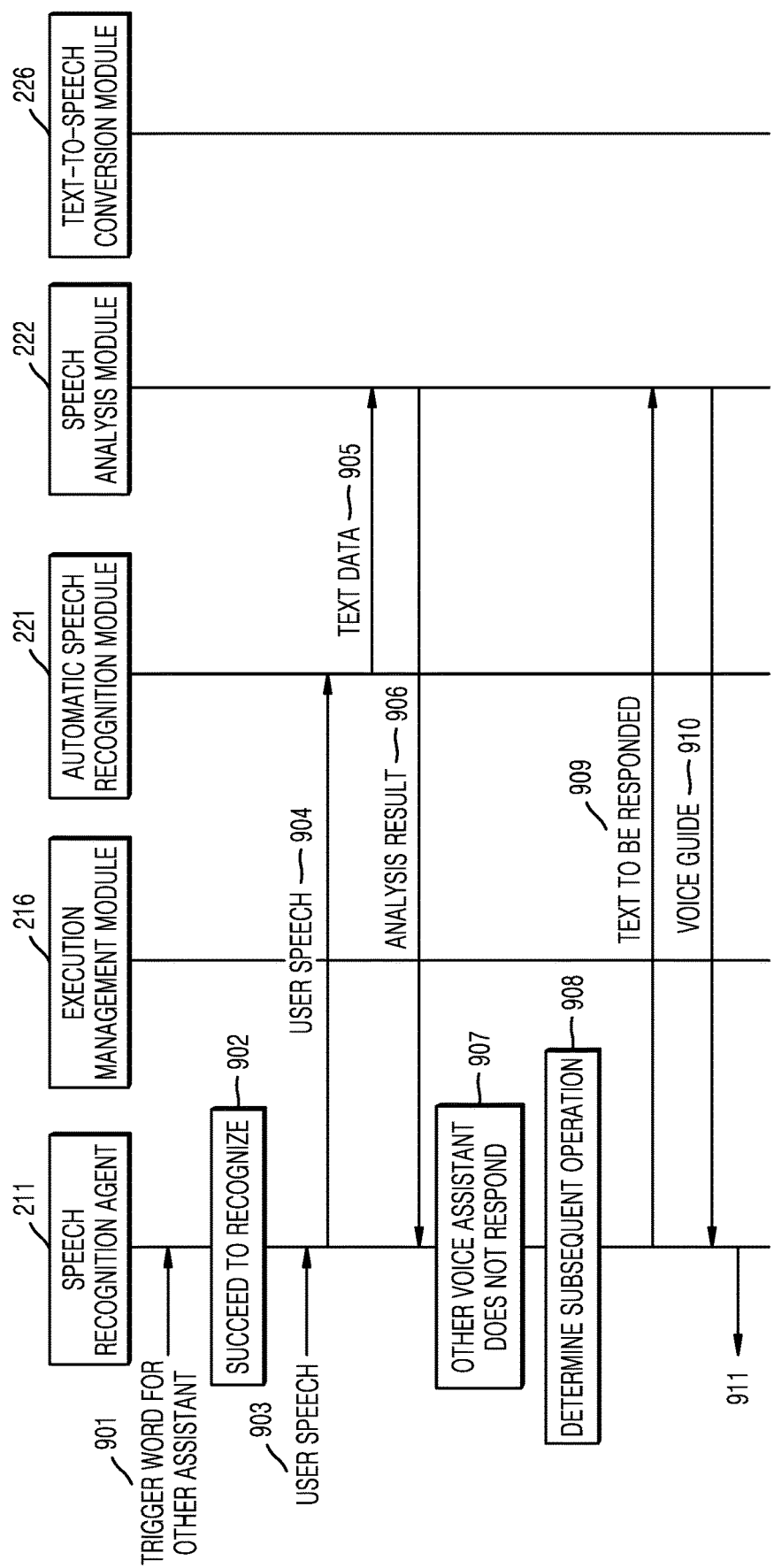
FIG. 9 is a flowchart for describing an operation in a case when another voice assistant does not respond after a trigger word for the other voice assistant is stated by a user, according to an embodiment of the disclosure.

FIG. 9 is a flowchart for describing an operation in a case when another voice assistant does not respond after a trigger word for the other voice assistant is stated by a user, according to an embodiment of the disclosure.

Referring to FIG. 9, in operation 901, the speech recognition agent 211 may receive a trigger word for another voice assistant.

In operation 902, the speech recognition agent 211 may succeed to recognize the trigger word for the other voice assistant, and enter a listening mode to wait for a speech of a user.

The speech recognition agent 211 may receive a speech of the user in operation 903, and provide the received speech of the user to the ASR module 221 in operation 904.

In operation 905, the ASR module 221 may recognize and convert the received speech of the user into text data and provide the text data corresponding to the speech to the speech analysis module 222.

In operation 906, the speech analysis module 222 may receive the text data corresponding to the speech of the user, analyze an intent of the user or the like, and transmit the analysis result to the speech recognition agent 211.

In operation 907, the speech recognition agent 211 may recognize that the other voice assistant does not provide a voice response to the speech of the user. For example, the other voice assistant may not provide a voice response within a certain time after receiving the speech of the user. No response may be caused by various reasons and, for example, the other voice assistant may not respond due to a poor speech recognition function thereof.

Figure 10:
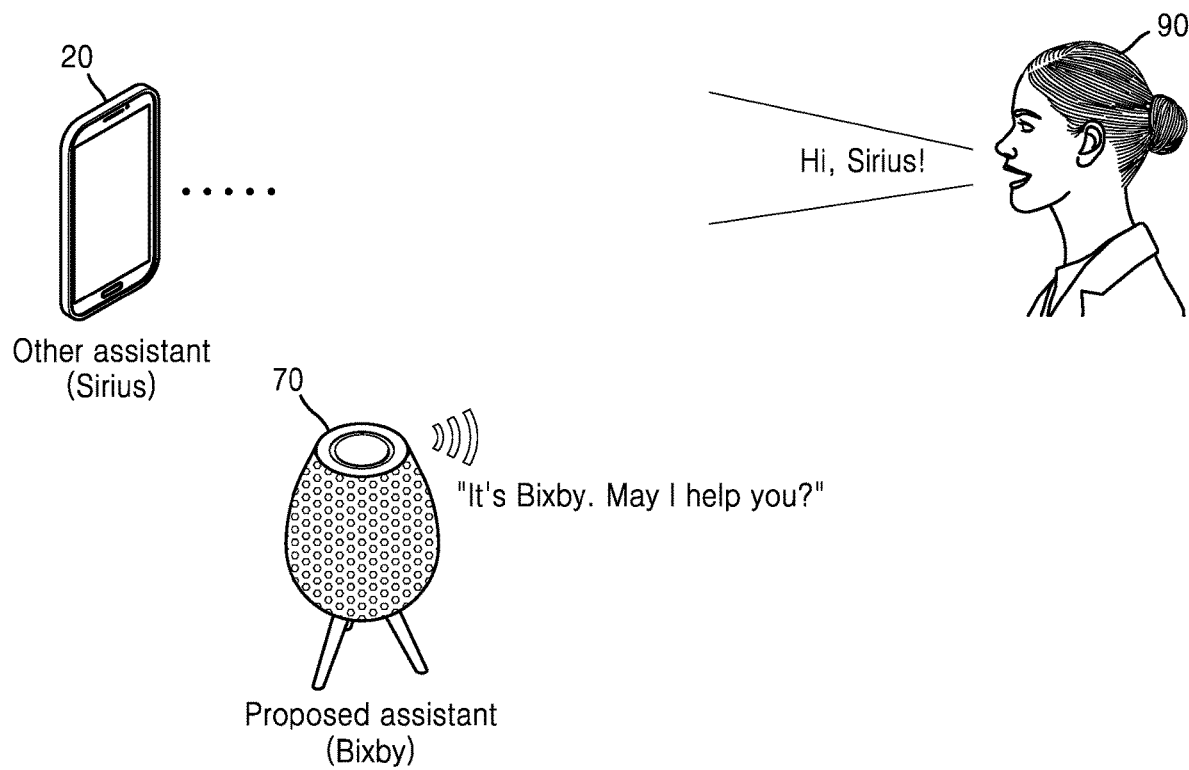
FIG. 10 is a reference view showing a case when another voice assistant does not respond to a trigger word.

FIG. 10 is a reference view showing a case when another voice assistant does not respond to a trigger word.

Referring to FIG. 10, for example, when a user states a trigger word such as "Hi, Sirius" to another voice assistant Sirius 20 but the other voice assistant Sirius does not provide any response within a certain time, the user may experience frustration or experience inconvenience when the user desires to request a service which requires a rapid response.

In operation 908, the speech recognition agent 211 may determine a subsequent operation in this case. For example, upon determining to interrupt and respond on behalf of the other voice assistant in this case, in operation 909, the speech recognition agent 211 may generate text to be responded and provide the same to the TTS conversion module 226. For example, the speech recognition agent 211 may provide text such as "It's Bixby. May I help you?" to the TTS conversion module 226.

The TTS conversion module 226 may convert the received text into a speech and provide the speech to the speech recognition agent 211 in operation 910, and the speech recognition agent 211 may output a speech such as "It's Bixby. May I help you?" in operation 911.

Operations 903 to 906 of FIG. 9 assume a case when a speech of the user other than the trigger word for the other voice assistant is received, but may be equally applied to a case when a speech of the user is not received.

FIG. 11 is a flowchart for describing an operation in a case when another voice assistant fails to provide a service in response to a service request of a user to the other voice assistant and a proposed voice assistant succeeds in a simulation and provides a notification to the user in real time, according to an embodiment of the disclosure.

Referring to FIG. 11, in operation 1101, the speech recognition agent 211 may receive a trigger word for another voice assistant.

In operation 1102, the speech recognition agent 211 may succeed to recognize the trigger word for the other voice assistant, and enter a listening mode to wait for a speech of a user.

The speech recognition agent 211 may receive a speech of the user in operation 1103, and provide the received speech of the user to the ASR module 221 in operation 1104.

In operation 1105, the ASR module 221 may recognize and convert the received speech of the user into text data and provide the text data corresponding to the speech to the speech analysis module 222.

In operation 1106, the speech analysis module 222 may receive the text data corresponding to the speech of the user, analyze an intent of the user or the like, and transmit the analysis result to the speech recognition agent 211.

In operation 1107, the speech recognition agent 211 may receive a speech corresponding to a voice response of the other voice assistant to the speech given by the user to request a service from the other voice assistant.

In operation 1108, the speech recognition agent 211 may provide the received speech corresponding to the voice response of the other voice assistant to the ASR module 221.

In operation 1109, the ASR module 221 may recognize and convert the received speech corresponding to the voice response of the other voice assistant into text data, and provide the text data corresponding to the speech to the speech analysis module 222.

In operation 1110, the speech analysis module 222 may receive the text data corresponding to the speech corresponding to the voice response of the other voice assistant, analyze an intent of the other voice assistant or the like, and transmit the analysis result to the speech recognition agent 211.

In operation 1111, the speech recognition agent 211 may determine whether the other voice assistant fails to provide the service, based on the result of analyzing the speech of the user and the result of analyzing the speech of the other voice assistant.

Upon determining that the other voice assistant fails to provide the service, the speech recognition agent 211 simulates an operation performed to correspond to the speech of the user to determine whether the service corresponding to the speech of the user is providable. Although the operation is performed for the simulation to provide the service according to the speech given by the user to request the service, the operation performance result is not provided to the user.

The speech recognition agent 211 provides the speech of the user to the ASR module 221 in operation 1112 to simulate, like an actual operation, the operation corresponding to the speech of the user, and the ASR module 221 converts the received speech of the user into text and provide the text to the speech analysis module 222 in operation 1113.

In operation 1114, the speech analysis module 222 may analyze an intent of the user, based on the received text data corresponding to the speech of the user, determine a task rule to be operated to correspond to the intent of the user, and provide the determined task rule to the speech recognition agent 211.

In operation 1115, the speech recognition agent 211 may provide the task rule received from the speech analysis module 222, to the execution management module 216.

In operation 1116, the execution management module 216 may perform an operation defined by the task rule, by executing one or more applications 141 according to the task rule received from the speech recognition agent 211, and provide the application execution result or the operation performance result to the speech recognition agent 211.

In operation 1117, the speech recognition agent 211 may determine whether the operation corresponding to the speech of the user is properly performed, that is, whether the operation for providing the service corresponding to the speech of the user is performable, by analyzing the operation performance result received from the execution management module 216. In this case, when the speech recognition agent 211 simulates the operation performed to correspond to the speech of the user and determines that the operation succeeds according to the simulation result, the speech recognition agent 211 may output a notification indicating that the service is providable by the proposed voice assistant, to the user, and a timing for outputting the notification may be determined in various manners. For example, the notification indicating that the service failed to be provided by the other voice assistant is providable by the proposed voice assistant may be output to the user in real time. For example, when the service is closely related to a current time or place and thus is meaningless when the notification is provided to the user later, the speech recognition agent 211 may output the notification in real time.

Upon determining to output the notification in real time, in operation 1118, the speech recognition agent 211 may determine text corresponding to the notification to be provided to the user, and provide the text to the TTS conversion module 226.

The TTS conversion module 226 may convert the text received from the speech recognition agent 211, into a speech and provide the same to the speech recognition agent 211 in operation 1119, and the speech recognition agent 211 may output the received speech to the user in operation 1120.

Meanwhile, although not shown in FIG. 11, not only a voice response but also a text response may be used to analyze the speech of the user or the response of the other voice assistant.

For example, when the other voice assistant outputs a visual UI as the response to the service request of the user and when the user selects a specific menu or button on the output visual UI, the visual UI may be analyzed as the text response of the other voice assistant and the specific menu or button selected on the visual UI may be used to analyze the intent of the user.

Figure 17:
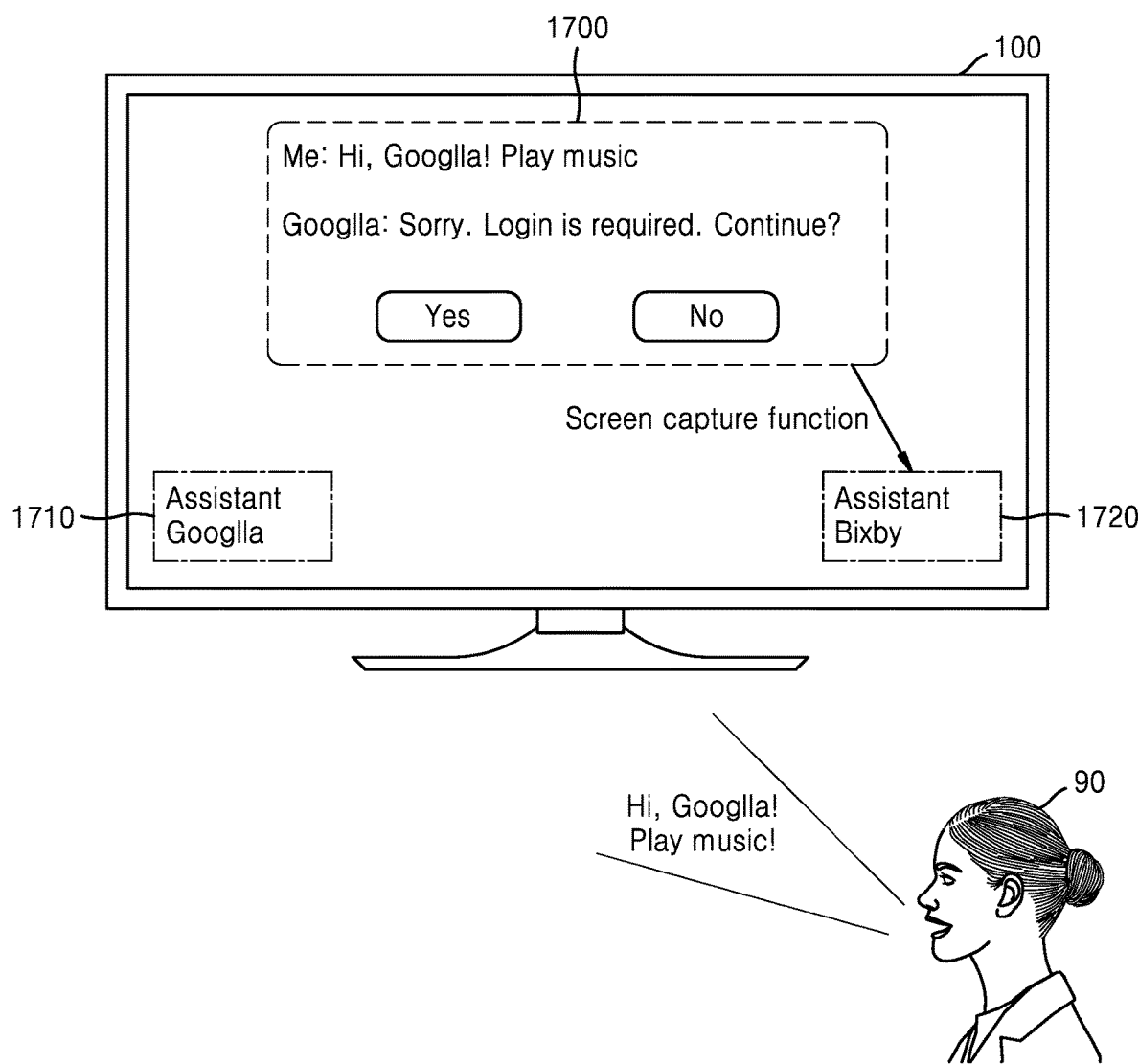
FIG. 17 illustrates an example of a screen for text analysis, according to an embodiment of the disclosure.

FIG. 17 is a reference view for describing a method of outputting a visual UI and using a response on the visual UI, according to an embodiment of the disclosure.

Referring to FIG. 17, when another voice assistant Googlla 1710 and a proposed voice assistant Bixby 1720 are installed together in the computing device 100, a user may request the other voice assistant Googlla 1710 by saying "Hi, Googlla! Play music", and the other voice assistant 1710 may output, as a visual UI, a GUI 1700 including "Sorry. Login is required. Continue? <Yes> <No>". When the other voice assistant 1710 provides a text response as described above, the speech recognition agent 211 may capture a screen output on the display 120 and request the ACR module 215 to recognize text in the captured screen. The recognized text may be transmitted to the NLU module 223 of the speech analysis module 222 to analyze the meaning of the text.

Figure 12A:
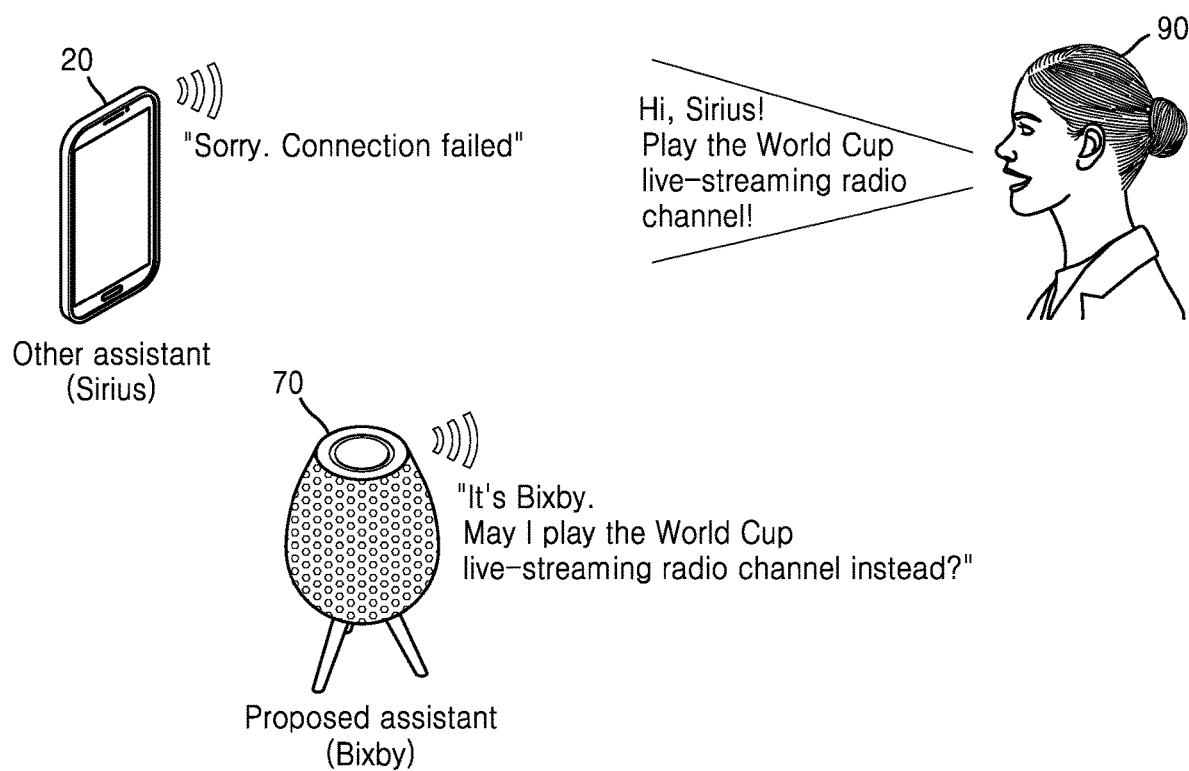
FIG. 12A is a reference view showing a case representing the operation illustrated in FIG. 11, according to an embodiment of the disclosure.

FIG. 12A is a reference view showing a case of the operation illustrated in FIG. 11, according to an embodiment of the disclosure.

Referring to FIG. 12A, a user 90 may state "Hi, Sirius! Play the World Cup live-streaming radio channel!" to request a service from another voice assistant Sirius.

However, the other voice assistant Sirius 20 may fail to provide the service due to a communication problem and output a voice response such as "Sorry. Connection failed" to the service request of the user.

A proposed voice assistant Bixby 70 may determine that the other voice assistant Sirius fails to provide the service requested by the user, by recognizing and analyzing the speech given by the user to request the service from the other voice assistant and the voice response of the other voice assistant to the service request. Upon determining that the other voice assistant fails to provide the service as described above, the proposed voice assistant Bixby 70 may simulate an operation corresponding to the service failed to be provided by the other voice assistant, i.e., an operation corresponding to "Play the World Cup live-streaming radio channel", and immediately notify the user that the service is providable, when the operation is performable. For example, the proposed voice assistant Bixby 70 may output a guide voice such as "It's Bixby. May I play the World Cup live-streaming radio channel instead?". For example, when a service of providing live-streaming content is requested, this type of the service may not be helpful when provided to the user later due to the characteristics of "live-streaming", and thus, a notification indicating that the service is providable may be output in real time.

In operation 1111 of FIG. 11, the proposed voice assistant simulates the operation corresponding to the service request of the user upon determining that the other voice assistant fails to provide the service, based on the result of analyzing the speech of the other voice assistant. However, embodiments of the disclosure are not limited thereto. Depending on embodiments of the disclosure, even when the other voice assistant does not fail to provide the service, the proposed voice assistant may simulate the operation corresponding to the service request of the user, compare the service result of the other voice assistant to the simulation result of the proposed voice assistant, and notify the user that the service is providable according to the simulation result of the proposed voice assistant, based on the comparison result.

Figure 12B:
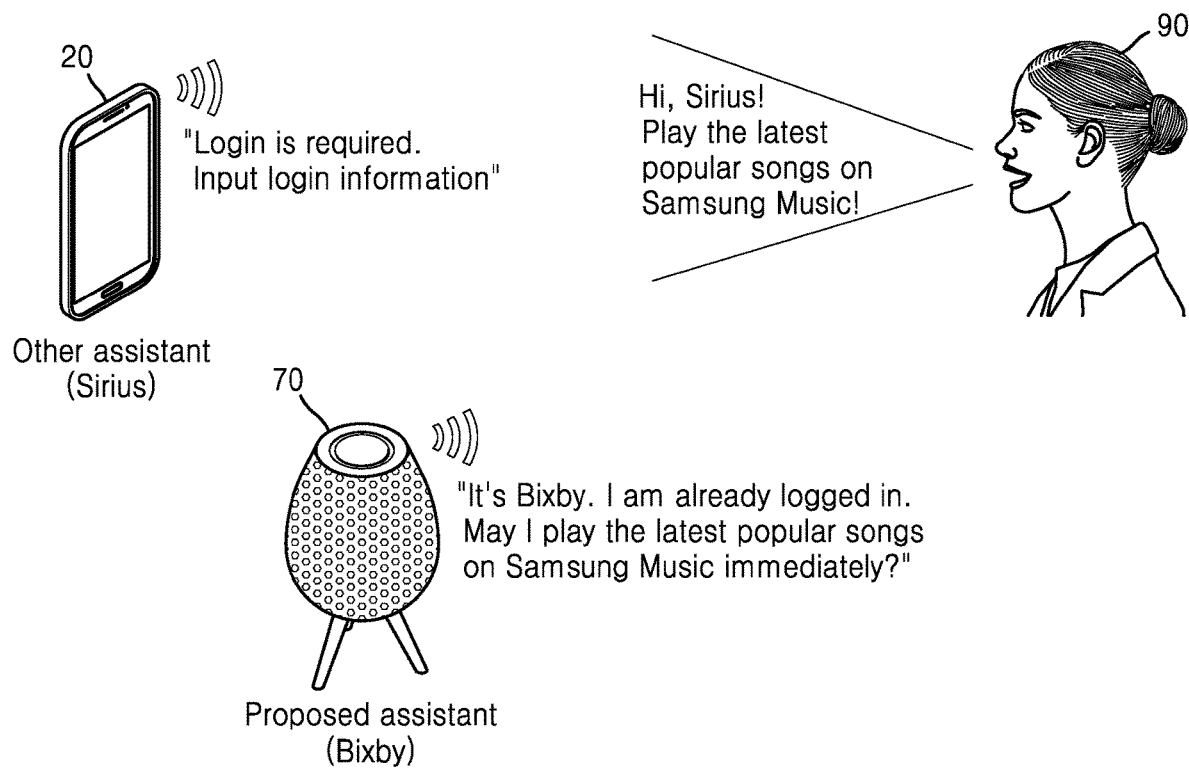
FIG. 12B is a reference view for describing a case when a proposed voice assistant compares a service result of another voice assistant to a simulation result of the proposed voice assistant and outputs a notification indicating that a service is providable according to the simulation result of the proposed voice assistant, according to an embodiment of the disclosure.

FIG. 12B is a reference view for describing a case when a proposed voice assistant compares a service result of another voice assistant to a simulation result of the proposed voice assistant and outputs a notification indicating that a service is providable according to the simulation result of the proposed voice assistant, based on the comparison result, according to an embodiment of the disclosure.

Referring to FIG. 12B, a user may state "Hi, Sirius! Play the latest popular songs on Samsung Music!" to request a service from another voice assistant Sirius.

However, the other voice assistant Sirius may not be currently logged in Samsung Music and thus output a voice response such as "Login is required. Input login information" to the service request of the user.

The proposed voice assistant Bixby may simulate an operation performed according to the same service request, and determine that the proposed voice assistant Bixby is currently logged in Samsung Music. Therefore, the proposed voice assistant Bixby may compare the service result of the other voice assistant, i.e., the login-required status, to the simulation result thereof, i.e., the currently logged-in status, and determine that a better service is providable because a login process is not required according to the simulation result thereof. Therefore, the proposed voice assistant Bixby may notify the user that the service is immediately providable. For example, the proposed voice assistant Bixby may output a guide voice such as "It's Bixby. I am already logged in. May I play the latest popular songs on Samsung Music immediately?". Therefore, according to the afore-described embodiment of the disclosure, not only when the other voice assistant fails to provide the service but also when the other voice assistant outputs a successful result or a result similar to success but a simulation result of the proposed voice assistant is determined as being better than the service result of the other voice assistant, the proposed voice assistant may provide a higher-quality service to the user by notifying the user that the service is providable by the proposed voice assistant.

FIG. 13 is a flowchart for describing an operation in a case when another voice assistant fails to provide a service in response to a service request of a user to the other voice assistant and a proposed voice assistant succeeds in a simulation and provides a notification to the user later when a service request is received from the user, according to an embodiment of the disclosure.

Operations from operation 1301 in which the speech recognition agent 211 receives a trigger word for another voice assistant to operation 1316 in which the execution management module 216 performs an operation defined by a task rule by executing one or more applications 141 according to the task rule received from the speech recognition agent 211, and provides the application execution result or the operation performance result to the speech recognition agent 211 are the same as those illustrated in FIG. 11, and thus descriptions thereof are not repeated herein.

In operation 1317, the speech recognition agent 211 may determine whether the operation corresponding to the speech of the user is properly performed, that is, whether the operation for providing the service corresponding to the speech of the user is performable, by analyzing the operation performance result received from the execution management module 216. In this case, when the speech recognition agent 211 simulates the operation performed to correspond to the speech of the user and determines that the operation succeeds according to the simulation result, the speech recognition agent 211 may output a notification indicating that the service is providable by the proposed voice assistant, to the user, and a timing for outputting the notification may be determined in various manners. For example, the notification indicating that the service failed to be provided by the other voice assistant is providable by the proposed voice assistant may be output to the user later when another arbitrary service request is received from the user. For example, when the service is not closely related to a current time or place and thus is helpful to the user even when the notification is provided to the user later, the speech recognition agent 211 may determine to output the notification later. That is, the speech recognition agent 211 may store a schedule for outputting the notification indicating that the service currently failed to be provided by the other voice assistant is providable by the proposed voice assistant, as an additional guide when a service request of the user is received later.

After a certain time, in operation 1318, the speech recognition agent 211 may receive a trigger word for the proposed voice assistant from the user.

In operation 1319, the speech recognition agent 211 may succeed to recognize the trigger word for the proposed voice assistant, and enter a listening mode to wait for a speech of the user.

When the speech recognition agent 211 receives a speech given by the user to request a service in operation 1320, the speech recognition agent 211 provides the speech of the user to the ASR module 221 in operation 1321, and the ASR module 221 converts the received speech of the user into text and provides the text to the speech analysis module 222 in operation 1322.

In operation 1323, the speech analysis module 222 may analyze an intent of the user, based on the text data corresponding to the received speech of the user, determine a task rule to be operated to correspond to the intent of the user, and provide the determined task rule to the speech recognition agent 211.

The speech recognition agent 211 may provide the task rule received from the speech analysis module 222, to the execution management module 216 in operation 1324, and the execution management module 216 may perform an operation defined by the task rule, by executing one or more applications 141 according to the task rule received from the speech recognition agent 211, and provide the application execution result or the operation performance result to the speech recognition agent 211 in operation 1325.

In operation 1326, the speech recognition agent 211 may analyze the operation performance result received from the execution management module 216, and output the operation performance result to the user when the operation corresponding to the speech of the user is properly performed, that is, when the operation for providing the service corresponding to the speech of the user is successfully performed.

Then, in operation 1327, the speech recognition agent 211 may additionally output, to the user, the previously stored notification, i.e., the notification indicating that the service failed by the other voice assistant is providable by the proposed voice assistant. To this end, the speech recognition agent 211 may determine text to be notified to the user and provide the same to the TTS conversion module 226 in operation 1327.

The TTS conversion module 226 may convert the text received from the speech recognition agent 211, into a speech and provide the same to the speech recognition agent 211 in operation 1328, and the speech recognition agent 211 may output the received speech to the user in operation 1329.

Operations 1327 and 1328 may be performed after operation 1317 to previously obtain and store the speech corresponding to the notification in the speech recognition agent 211, and an additional guide may be output immediately after operation 1326.

Figure 14:
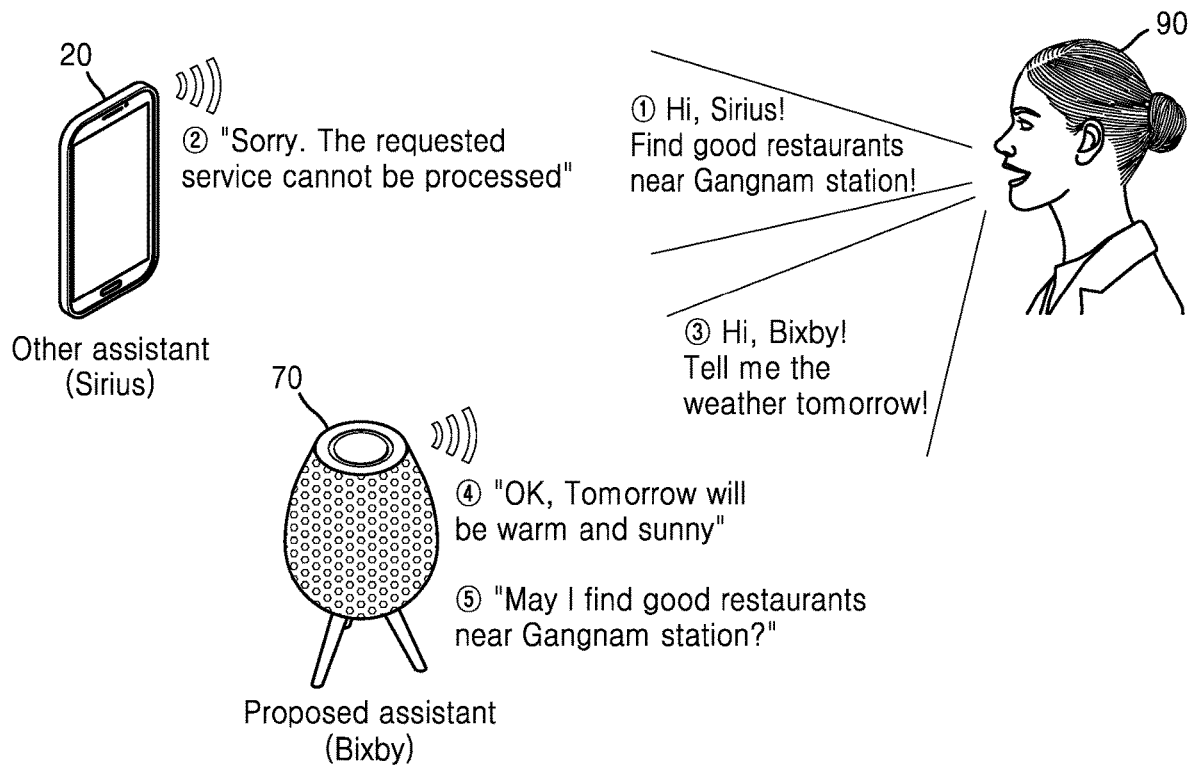
FIG. 14 is a reference view for describing a case when a notification is provided to a user based on a request of the user, according to an embodiment of the disclosure.

FIG. 14 is a reference view showing a case of the operation illustrated in FIG. 13, according to an embodiment of the disclosure.

Referring to FIG. 14, a user 90 may state "Hi, Sirius! Find good restaurants near Gangnam station!" to request a service from another voice assistant Sirius 20.

However, the other voice assistant Sirius 20 may fail to provide the service due to a communication problem or for any other reason and output a voice response such as "Sorry. The requested service cannot be processed" to the service request of the user.

A proposed voice assistant Bixby 70 may determine that the other voice assistant Sirius 20 fails to provide the service requested by the user, by recognizing and analyzing the speech given by the user to request the service from the other voice assistant, and the voice response of the other voice assistant to the service request. Upon determining that the other voice assistant 20 fails to provide the service as described above, the proposed voice assistant Bixby 70 may simulate an operation corresponding to the service failed to be provided by the other voice assistant, i.e., an operation corresponding to "Find good restaurants near Gangnam station", and store a notification indicating that the service is providable, when the operation is performable. After that, when the user gives a speech corresponding to a service request such as "Hi, Bixby! Tell me the weather tomorrow!" to the proposed voice assistant Bixby 70 later, the proposed voice assistant Bixby may perform an operation of checking tomorrow's weather by using a weather application or the like, and output the operation performance result, e.g., a guide voice such as "OK, Tomorrow will be warm and sunny". In addition, the proposed voice assistant Bixby 70 may output the stored notification, e.g., a guide voice such as "May I find good restaurants near Gangnam station?". Because a service of providing information based on an arbitrary place is not generally closely related to time and thus may be mostly useful to a user even when provided later not immediately after the service is requested by the user, outputting of a notification as an additional guide in this case may be meaningful to the user. By providing the additional guide as described above, the user may receive a guide of a voice assistant without repeatedly requesting the service previously failed to receive, and thus user convenience may be increased.

Figure 15:
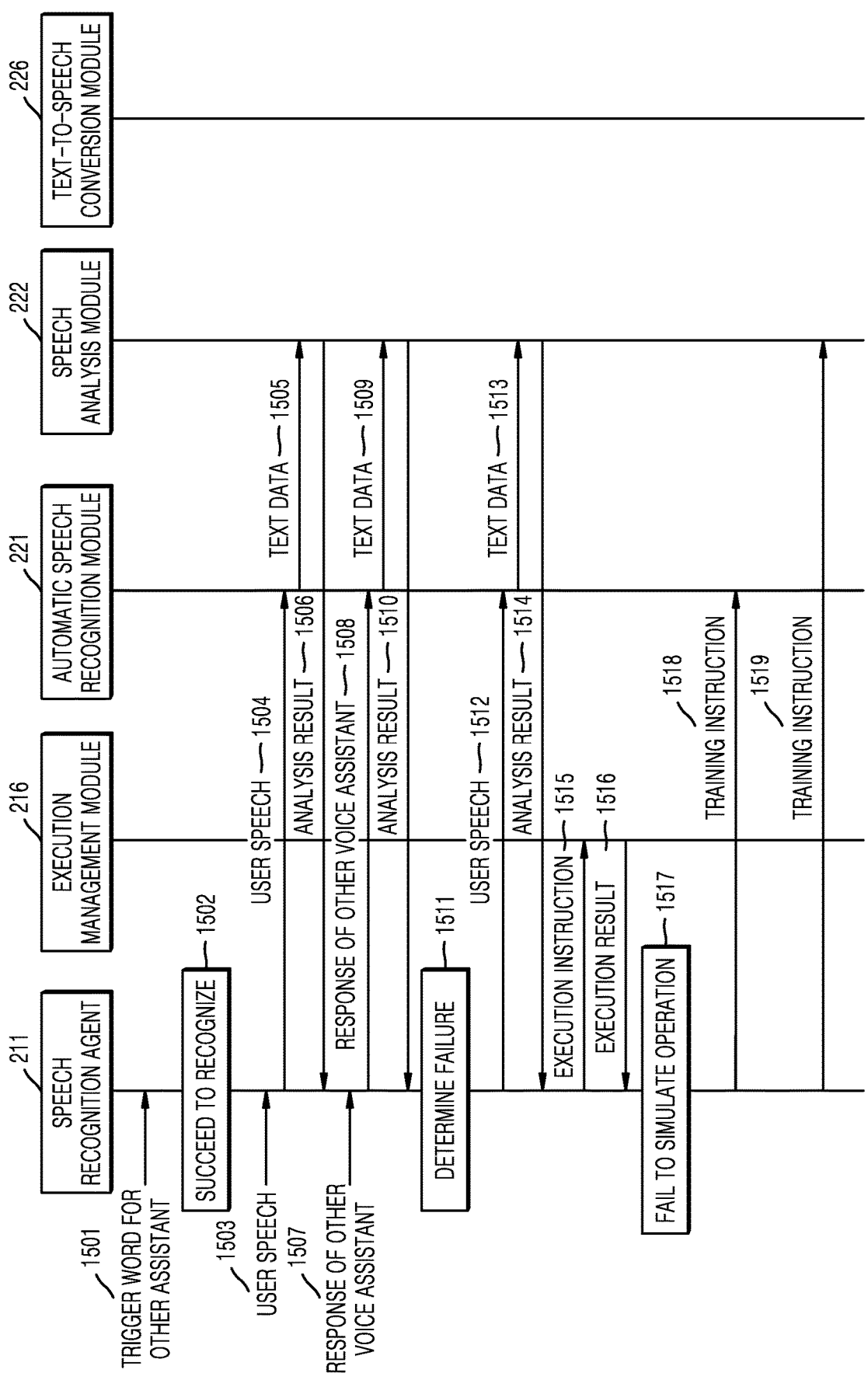
FIG. 15 is a flowchart for describing an example of an operation in a case when another voice assistant fails to provide a service in response to a service request of a user to the other voice assistant and a proposed voice assistant fails in a simulation, according to an embodiment of the disclosure.

FIG. 15 is a flowchart for describing a subsequent operation in a case when another voice assistant fails to provide a service in response to a service request of a user to the other voice assistant and a proposed voice assistant also fails in a simulation, according to an embodiment of the disclosure.

Operations from operation 1501 in which the speech recognition agent 211 receives a trigger word for another voice assistant to operation 1516 in which the execution management module 216 performs an operation defined by a task rule by executing one or more applications 141 according to the task rule received from the speech recognition agent 211, and provides the application execution result or the operation performance result to the speech recognition agent 211 are the same as those illustrated in FIG. 11, and thus descriptions thereof are not repeated herein.

In operation 1517, the speech recognition agent 211 may determine whether the operation corresponding to the speech of the user is properly performed, that is, whether the operation for providing the service corresponding to the speech of the user is performable, by analyzing the operation performance result received from the execution management module 216. In this case, when the speech recognition agent 211 simulates the operation performed to correspond to the speech of the user and determines that the operation fails according to the simulation result, the speech recognition agent 211 may analyze a cause of failure of the operation.

Upon determining that the cause of failure of the operation is a speech recognition or intent analysis error, based on the result of analyzing the cause of failure of the operation, the speech recognition agent 211 may transmit a training instruction to the ASR module 221 in operation 1518 or transmit a training instruction to the speech analysis module 222 in operation 1519. The ASR module 221 or the speech analysis module 222 having received the training instruction may train and update one or more internal modules per element such as language/acoustic model, threshold setting criterion, or candidate selection criterion.

Even when the proposed voice assistant fails to simulate the operation corresponding to the service failed to be provided by the other voice assistant as described above, the proposed voice assistant may train and update the ASR module 221 or the speech analysis module 222 on the basis of the cause of failure and thus the performance of the proposed voice assistant may be increased.

Figure 16:
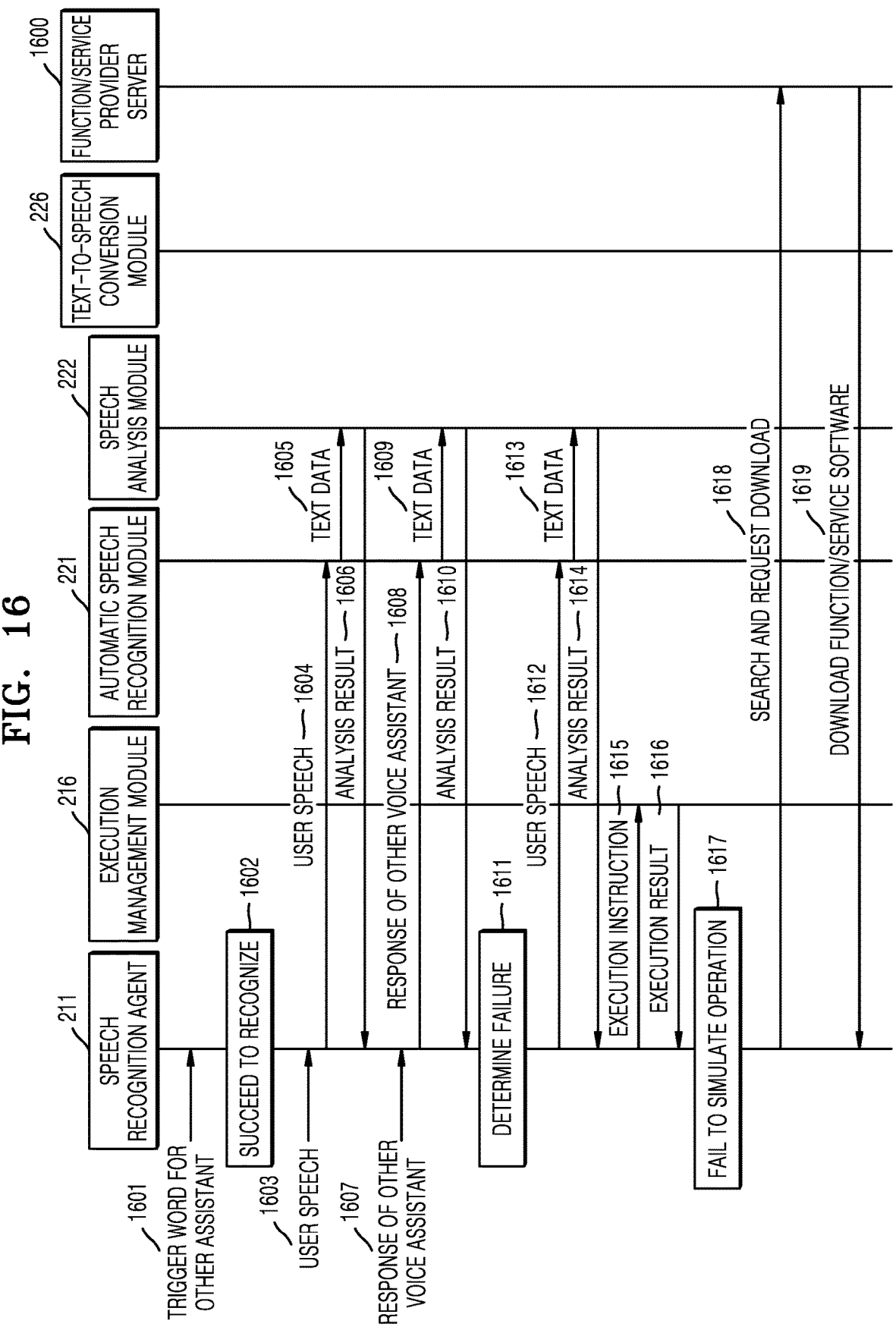
FIG. 16 is a flowchart for describing another example of an operation in a case when another voice assistant fails to provide a service in response to a service request of a user to the other voice assistant and a proposed voice assistant fails in a simulation, according to an embodiment of the disclosure.

FIG. 16 is a flowchart for describing of a subsequent operation in a case when another voice assistant fails to provide a service in response to a service request of a user to the other voice assistant and a proposed voice assistant also fails in a simulation, according to an embodiment of the disclosure.

Operations from operation 1601 in which the speech recognition agent 211 receives a trigger word for another voice assistant to operation 1616 in which the execution management module 216 performs an operation defined by a task rule by executing one or more applications 141 according to the task rule received from the speech recognition agent 211, and provides the application execution result or the operation performance result to the speech recognition agent 211 are the same as those illustrated in FIG. 11, and thus descriptions thereof are not repeated herein.

In operation 1617, the speech recognition agent 211 may determine whether the operation corresponding to the speech of the user is properly performed, that is, whether the operation for providing the service corresponding to the speech of the user is performable, by analyzing the operation performance result received from the execution management module 216. In this case, when the speech recognition agent 211 simulates the operation performed to correspond to the speech of the user and determines that the operation fails according to the simulation result, the speech recognition agent 211 may analyze a cause of failure of the operation. Based on the result of analyzing the cause of failure of the operation, the speech recognition agent 211 may determine that the cause of failure of the operation is that a function or service corresponding to the request of the user is absent or unavailable in the proposed voice assistant.

According to an embodiment of the disclosure, in operation 1618, the speech recognition agent 211 may find a function/service provider server 1600 for providing the function or service which is currently absent or unavailable in the proposed voice assistant, and request the found function/service provider server 1600 to provide the function or service.

In operation 1619, the speech recognition agent 211 may download a software module or a software update version corresponding to the requested function or service from the function/service provider server 1600 and install the software module or update software.

When the requested function or software may not be obtained from the function/service provider server 1600, the speech recognition agent 211 may register in the function/service provider server 1600 that the function/service is required by the proposed voice assistant.

When the requested function or software may not be currently obtained from the function/service provider server 1600, the speech recognition agent 211 may record and manage the function or service as a function enhancement item.

When the requested function or software may not be currently obtained from the function/service provider server 1600 according to a search result but information indicating when the function or software is available or updatable is received therefrom, the speech recognition agent 211 may store the information in a dialogue system of the speech analysis module 222 and provide the information when the user requests the function or service later. For example, when a request for a service currently unavailable in the proposed voice assistant is received from the user, instead of a response such as "The requested function is not currently serviced", the proposed voice assistant may provide a notification about when the service requested by the user is available, e.g., "The requested service will be available next month. Thanks for understanding", to the user and thus user convenience may be increased by providing information more than the notification merely indicating that the service is unavailable, to allow the user to expect the service.

Some embodiments of the disclosure may be implemented in the form of a recording medium including instructions executable by a computer, e.g., a program module executed by the computer. A computer-readable medium may be an arbitrary available medium that can be accessed by the computer, and examples thereof include all of volatile, non-volatile, detachable, and non-detachable media. The computer-readable medium may include a computer storage medium. Examples of the computer storage medium include all of volatile, non-volatile, detachable, and non-detachable media implemented using an arbitrary method or technology for storing information such as computer-readable instructions, data structures, program modules, or other data.

The afore-described embodiments of the disclosure may be implemented using a software program including instructions stored in a computer-readable storage medium.

The computer is a device capable of fetching instructions stored in a storage medium, and operating according to the embodiments of the disclosure based on the fetched instructions, and may include an electronic device according to the embodiments of the disclosure.

The computer-readable storage medium may be provided in the form of a non-transitory storage medium. When the storage medium is 'non-transitory', it means that the storage medium does not include signals and is tangible, and it does not limit that data is semi-permanently or temporarily stored in the storage medium.

A control method according to the embodiments of the disclosure may be included and provided in a computer program product. The computer program product may be traded between a seller and a buyer.

The computer program product may include a software program, and a computer-readable storage medium having the software program stored therein. For example, the computer program product may include a product that is electronically distributed in the form of a software program (e.g., a downloadable application) via a manufacturer of the electronic device or an electronic market (e.g., Google Play or App Store). For electronic distribution, at least a part of the software program may be stored in a storage medium or be temporarily generated. In this case, the storage medium may be a storage medium of a server of the manufacturer, a server of the electronic market, or a relay server that temporarily stores the software program.

The computer program product may include a storage medium of a server or a storage medium of a device in a system including the server and the device. Otherwise, when a third device (e.g., a smartphone) connected and communicating with the server or the device is present, the computer program product may include a storage medium of the third device. Alternatively, the computer program product may include a software program itself that is transmitted from the server to the device or the third device, or from the third device to the device.

In this case, one of the server, the device, and the third device may execute the computer program product to perform the method according to the embodiments of the disclosure. Alternatively, two or more of the server, the device, and the third device may execute the computer program product to perform the method according to the embodiments of the disclosure in a distributed fashion.

For example, the server (e.g., a cloud server or an artificial intelligence (AI) server) may execute the computer program product stored therein, to control the device connected and communicating with the server, to perform the method according to the embodiments of the disclosure.

As another example, the third device may execute the computer program product to control the device connected and communicating with the third device, to perform the method according to the embodiments of the disclosure. When the third device executes the computer program product, the third device may download the computer program product from the server and execute the downloaded computer program product. Alternatively, the third device may execute the computer program product provided in a preloaded state, to perform the method according to the embodiments of the disclosure.

As used herein, the term "unit" may indicate a hardware component such as a processor or a circuit, and/or a software component executed by the hardware component such as the processor.

According to various embodiments of the disclosure, without being additionally connected to another voice assistant system or implementing a complicated structure, a proposed voice assistant system may achieve intelligence enhancement and service enhancement by analyzing a speech and a request to the other voice assistant, a response of the other voice assistant, a cause of failure of the response, etc.

For example, when an operation corresponding to a speech corresponding to a service request of a user to the other voice assistant is simulated and fails, the failed operation may be used to train the proposed voice assistant or to update a function or service requested by the user, thereby enhancing intelligence of the proposed voice assistant and expanding the function or service.

For example, when an operation corresponding to a speech corresponding to a service request of a user to the other voice assistant is simulated and succeeds, the proposed voice assistant may notify the user that the service failed to be provided by the other voice assistant is providable, or provide the service to the user, thereby increasing user convenience.

By providing the function or service failed by the other voice assistant as described above, the proposed voice assistant may be regarded as a more intelligent voice assistant compared to the other voice assistant such that user satisfaction may be increased and competitiveness may be ensured compared to the other voice assistant.

The above descriptions of the disclosure are provided for the purpose of illustration, and it will be understood by one of ordinary skill in the art that various changes in form and details may be made therein without departing from the scope of the disclosure. Therefore, it should be understood that embodiments of the disclosure described herein should be considered in a descriptive sense only and not for purposes of limitation. For example, each component described to be of a single type can be implemented in a distributed manner and, likewise, components described as being distributed can be implemented in a combined manner.

The scope of the disclosure is defined by the following claims rather than by the detailed description, and it should be understood that all modifications from the claims and their equivalents are included in the scope of the disclosure.

What is claimed is:

1. A computing device for providing a voice assistant function of a voice assistant, the computing device comprising:
   a memory storing one or more instructions; and
   a processor configured to execute the one or more instructions stored in the memory to perform a process comprising:
      recognizing a trigger word spoken to another voice assistant;
      analyzing a response of the other voice assistant in response to a speech spoken to the other voice assistant subsequent to the trigger word;
      simulating an operation to be performed in response to the speech; and
      performing a subsequent operation, based on a result of the simulating and a result of the analyzing.

2. The computing device of claim 1, wherein the process further comprises:
   learning the trigger word such that a recognition rate of the trigger word is equal to or greater than a threshold, when the recognition rate of the trigger word is less than a threshold.

3. The computing device of claim 1, wherein the speech spoken to the other voice assistant comprises at least one of a speech to request a service, a speech given after a response of the other voice assistant to the request, or an answer of a user to a question of the other voice assistant.

4. The computing device of claim 1, wherein the response of the other voice assistant comprises at least one of a voice response, an image response, and a text response.

5. The computing device of claim 4, wherein the process further comprises:
   determining whether the response of the other voice assistant obtains a result satisfying a request according to the speech, based on at least one of the at least one of the voice response, the image response, and the text response.

6. The computing device of claim 1, wherein the process further comprises:
   determining, according to the result of the simulating, whether the response of the other voice assistance obtains a result satisfying a request according to the speech, and
   providing a notification to a user when the determining determines that the response of the other voice assistant obtains the result satisfying the request according to the speech.

7. The computing device of claim 1, wherein the process further comprises:
   determining, according to the result of the simulating, whether the response of the other voice assistance obtains a result satisfying a request according to the speech, and
   providing a notification to the user in real time when the determining determines that the response of the other voice assistant does not obtain the result satisfying the request according to the speech.

8. The computing device of claim 6, wherein the process further comprises:
   when the determining determines that the response of the other voice assistant does not obtain the result satisfying a request according to the speech, providing a notification to the user when the request is again made later.

9. The computing device of claim 1, wherein the process further comprises:
   utilizing a result of performing the subsequent operation in updating a learning system of the computing device when determining that the operation to be performed in response the speech fails according to the result of the simulating.

10. The computing device of claim 9, wherein the process further comprises:
    updating a speech recognition system when determining that the operation to be performed in response to the speech fails due to recognition failure or an intent analysis error.

11. A method of operating a computing device for providing a voice assistant function of a voice assistant, the method comprising:
    recognizing a trigger word spoken to another voice assistant;
    analyzing a response of the other voice assistant in response to a speech spoken to the other voice assistant subsequent to the trigger word;
    simulating an operation to be performed in response to the speech; and
    performing a subsequent operation, based on a result of the simulating and a result of the analyzing.

12. The method of claim 11, wherein the speech spoken to the other voice assistant comprises at least one of a speech to request a service, a speech given after a response of the other voice assistant to the request, or an answer of a user to a question of the other voice assistant.

13. The method of claim 11, wherein the response of the other voice assistant comprises at least one of a voice response, an image response, and a text response.

14. The method of claim 13, further comprising:
    determining whether the response of the other voice assistant obtains a result satisfying a request according to the speech, based on at least one of the at least one of the voice response, the image response, and the text response.

15. The method of claim 14, further comprising:
    providing a notification to a user in real time when the determining determines that the response of the other voice assistant does not obtain the result satisfying the request according to the speech.

16. The method of claim 14, further comprising:
    when the determining determines that the response of the other voice assistant does not obtain the result satisfying the request according to the speech, providing a notification to the user when the request is again made later.

17. The method of claim 11, further comprising:
    utilizing a result of performing the subsequent operation in updating a system when determining that the operation to be performed in response to the speech fails according to the result of the simulating.

18. The method of claim 11, further comprising:
    updating a speech recognition system when determining that the operation to be performed in response to the speech fails according to the simulation result due to recognition failure or an intent analysis error.

19. The method of claim 11, further comprising:
updating a system of the computing device to enhance a function or a service or transmitting a function/service enhancement request to an external server when determining that the operation to be performed in response to the speech fails due to absence of a function or service.

20. A non-transitory computer-readable recording medium having recorded thereon a program for performing a method of operating a computing device for providing a voice assistant function of a voice assistant, the method comprising:
recognizing a trigger word spoken to another voice assistant;
analyzing a response of the other voice assistant in response to a speech spoken to the other voice assistant subsequent to the trigger word;
simulating an operation to be performed in response to the speech; and
determining and performing a subsequent operation, based on a result of the simulating and a result of the analyzing.

\* \* \* \* \*